United States Patent
Zhang et al.

(10) Patent No.: US 8,331,951 B2
(45) Date of Patent: Dec. 11, 2012

(54) SYSTEM AND METHOD FOR UPLINK INTER CELL INTERFERENCE COORDINATION IN A WIRELESS ACCESS SYSTEM

(75) Inventors: Hang Zhang, Nepean (CA); Jia Ming, Ottawa (CA); Israfil Bahceci, Nepean (CA)

(73) Assignee: FutureWei Technologies, Inc., Plano, TX (US)

( * ) Notice: Subject to any disclaimer, the term of this patent is extended or adjusted under 35 U.S.C. 154(b) by 0 days.

(21) Appl. No.: 13/476,426

(22) Filed: May 21, 2012

(65) Prior Publication Data

US 2012/0224650 A1    Sep. 6, 2012

Related U.S. Application Data

(63) Continuation of application No. 12/814,077, filed on Jun. 11, 2010, now Pat. No. 8,208,937.

(60) Provisional application No. 61/186,719, filed on Jun. 12, 2009, provisional application No. 61/234,218, filed on Aug. 14, 2009.

(51) Int. Cl.
*H04W 88/02* (2009.01)

(52) U.S. Cl. ........................................... 455/453

(58) Field of Classification Search .................. 455/453, 455/509, 513, 452.1, 452.2, 450, 36.4; 370/311, 370/336, 338, 352; 375/279, 267; 725/39; 718/107

See application file for complete search history.

(56) References Cited

U.S. PATENT DOCUMENTS

| | | | |
|---|---|---|---|
| 6,243,371 B1 | 6/2001 | Chawla et al. | |
| 2007/0004423 A1 | 1/2007 | Gerlach et al. | |
| 2007/0086406 A1 | 4/2007 | Papasakellariou | |
| 2009/0245197 A1 | 10/2009 | Ma et al. | |
| 2010/0216477 A1 | 8/2010 | Ryan | |
| 2010/0248730 A1 | 9/2010 | Han et al. | |
| 2011/0317742 A1* | 12/2011 | Kawahatsu et al. | 375/132 |
| 2012/0069824 A1* | 3/2012 | Papadopoulos et al. | 370/336 |
| 2012/0122513 A1* | 5/2012 | Yang et al. | 455/522 |
| 2012/0140702 A1* | 6/2012 | Takano | 370/315 |
| 2012/0157155 A1* | 6/2012 | Cho et al. | 455/522 |

FOREIGN PATENT DOCUMENTS

| | | |
|---|---|---|
| CN | 101043693 A | 9/2007 |
| CN | 101227695 A | 7/2008 |
| EP | 1 594 260 A1 | 11/2005 |
| WO | WO 2007/022631 A1 | 3/2007 |

OTHER PUBLICATIONS

Won, S-H., et al., "Inter-Cell Interference Coordination/Avoidance for Frequency Reuse by Resource Scheduling in an OFDM-based Cellular System," Vehicular Technology Conference, IEEE 66th, 2007, pp. 1722-1725.

European Search Report, Application No. 10785768.2-1246, Huawei Technologies Co., Ltd., Jun. 25, 2012, 6 pages.

PCT International Search Report, International Application No. PCT/CN2010/073887, Huawei Technologies Co. Ltd. et al., Sep. 9, 2010, 10 pages.

* cited by examiner

*Primary Examiner* — Diane Mizrahi
(74) *Attorney, Agent, or Firm* — Slater & Matsil, L.L.P.

(57) ABSTRACT

A system and method for uplink inter cell interference coordination and multi-user multiple input, multiple output in a wireless access system are provided. A method for providing uplink inter cell interference coordination in a wireless access system includes categorizing users the wireless access system, selecting a resource allocation plan based on the categorized users, allocating resources to the users in the wireless access system based on the selected resource allocation plan, and receiving transmissions from the users.

15 Claims, 27 Drawing Sheets

SYSTEM AND METHOD FOR UPLINK INTER CELL INTERFERENCE COORDINATION IN A WIRELESS ACCESS SYSTEM

This application is a continuation of U.S. Non-Provisional application Ser. No. 12/814,077, entitled "System and Method for Uplink Inter Cell Interference Coordination in a Wireless Access System," filed on Jun. 11, 2010, which claims the benefit of U.S. Provisional Application No. 61/186,719, filed on Jun. 12, 2009, entitled "System and Method for Uplink Inter Cell Interference Coordination in a Wireless Access System," and U.S. Provisional Application No. 61/234,218, filed on Aug. 14, 2009, entitled "System and Method for Uplink Inter Cell Interference Coordination in a Wireless Access System," all of which applications are hereby incorporated herein by reference.

TECHNICAL FIELD

The present invention relates generally to wireless communications, and more particularly to a system and method for uplink (UL) inter cell interference coordination (ICIC) and multi-user multiple input, multiple output (MU-MIMO) in a wireless access system.

BACKGROUND

In a cellular wireless access system making use of a reuse-1 resource allocation plan, transmissions to and from users located at a cell edge typically result in more interference than transmissions to and from users located at cell centers. The throughput of users at cell edges is usually less than the average cell throughput due to factors such as large path loss and interference mitigation techniques such as fractional power control.

A commonly used solution to this problem is known as Fractional Frequency Reuse (FFR). In a FFR system, a radio frequency band of a cell may be divided into a number of subbands, for example, three. One of three neighbor cells uses one of the subbands to schedule its cell edge users (CEU) and uses the other two subbands to schedule its cell center users (CCU), with all of the three subbands operating on reuse-1, i.e., neighbor cells use the same resources for their own users.

SUMMARY OF THE INVENTION

These and other problems are generally solved or circumvented, and technical advantages are generally achieved, by preferred embodiments of the present invention which provide a system and method for UL ICIC and MU-MIMO in a wireless access system.

In accordance with a preferred embodiment of the present invention, a method for providing uplink inter cell interference coordination in a wireless access system is provided. The method includes categorizing users in the wireless access system, selecting a resource allocation plan based on the categorized users, allocating resources to the users in the wireless access system based on the selected resource allocation plan, and receiving transmissions from the users.

In accordance with another preferred embodiment of the present invention, a method for providing uplink inter cell interference coordination in a wireless access system is provided. The method includes determining if at least one cell edge user (CEU) and at least one cell center user (CCU) controlled by a communications controller both have a transmission to transmit to the communications controller, granting a first transmission opportunity to a CEU of the at least one CEU and a second transmission opportunity to a CCU of the at least one CCU if there are at least one CEU and at least one CCU controlled by the communications controller both have a transmission to transmit to the communications controller, granting (a third transmission opportunity to a first CEU of the at least one CEU and a fourth transmission opportunity to a second CEU of the at least one CEU) or (the third transmission opportunity to a first CCU of the at least one CCU and the fourth transmission opportunity to a second CCU of the at least one CCU) if there are not at least one CEU and at least one CCU controlled by the communications controller that both have a transmission to transmit to the communications controller, and transmitting information regarding the first transmission opportunity and the second transmission opportunity or the third transmission opportunity and the fourth transmission opportunity to the at least one CEU and to the at least one CCU. The first transmission opportunity and the second transmission opportunity occur simultaneously and over identical network resources, and a first transmit power level of the first transmission opportunity and a second transmit power level of the second transmission opportunity are substantially equal to transmit power levels of the first transmission opportunity and the second transmission opportunity if the first transmission opportunity and the second transmission opportunity were to occur separately. The third transmission opportunity and the fourth transmission opportunity occur simultaneously and over identical network resources, and a third transmit power level of the third transmission opportunity and a fourth transmit power level of the fourth transmission opportunity are less than transmit power levels of the third transmission opportunity and the fourth transmission opportunity if the third transmission opportunity and the fourth transmission opportunity were to occur separately.

In accordance with another preferred embodiment of the present invention, a method for receiving transmissions in a sectorized communications system is provided. The method includes determining communications system load conditions at a communications controller, determining if the communications system is imbalanced based on the communications system load conditions, adjusting frequency band allocations if the communications system is imbalanced, allocate transmission opportunities for communications devices based on the frequency band allocations, and transmitting information regarding the allocated transmission opportunities to communications devices that have been allocated transmission opportunities. The communications system load conditions are for sectors controlled by the communications controller and for sectors adjacent to sectors controlled the communications controller, and the frequency band allocations are unchanged if the communications system is balanced.

An advantage of an embodiment is that network resources of a communications system may be allocated based on a classification of users in the communications system, thereby providing a dynamic allocation of network resources to meet potentially changing system conditions.

A further advantage of an embodiment is that UL multi-user MIMO (MU-MIMO) may be supported by allowing users of different groups, e.g., Cell Center Users (CCU) and Cell Edge Users (CEU), to transmit without having to reduce user transmit power levels to reduce ICI, thereby performance is not sacrificed in order to support UL MU-MIMO.

Yet another advantage of an embodiment is that in an unbalanced communications system wherein different cells have different traffic loads, system bandwidth may be adjusted to provide increased bandwidth to heavily loaded cells while bandwidth of lightly loaded cells may be decreased.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 19b is a diagram of a frequency band allocation for use with a sector diagram of wireless access system shown in FIG. 19a;

FIG. 20b is a diagram of a frequency band allocation for use with a sector diagram of wireless access system shown in FIG. 20a;

FIG. 21b is a diagram of a frequency band allocation for use with a sector diagram of wireless access system shown in FIG. 21a;

FIG. 22b is a diagram of a frequency band allocation for use with a sector diagram of wireless access system shown in FIG. 22a;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a Third Generation Partnership Project (3GPP) Long Term Evolution (LTE) compliant communications system. The invention may also be applied, however, to other communications systems, such as those that are 3GPP LTE-Advanced, WiMAX, and so forth, compliant.

Figure 1A:
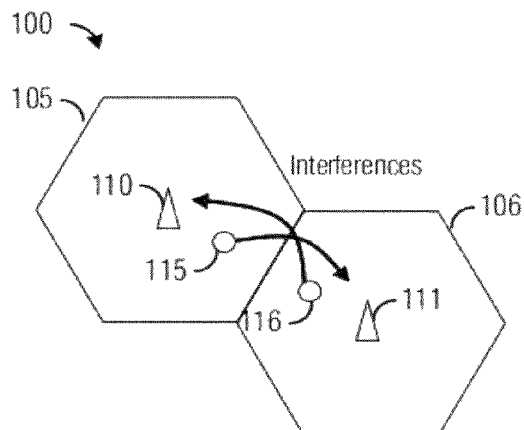
FIG. 1a is a diagram of a wireless access system.
Figure 1B:
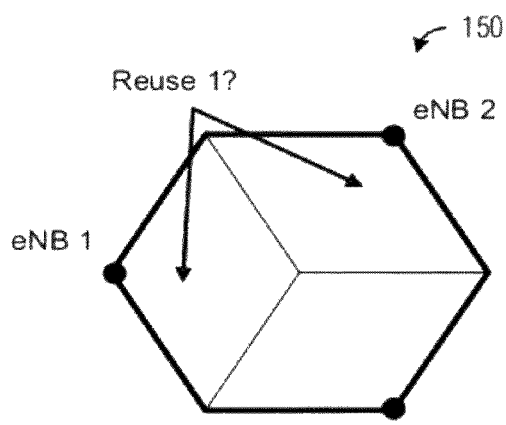
FIG. 1b is a sector diagram of a wireless access system.

FIG. 1*a* illustrates a portion of a wireless access system 100. Wireless access system 100 includes two cells, cell 105 and cell 106. Cell 105 may be served by an enhanced Node B (eNB) 110 and cell 106 may be served by eNB 111. A User Equipment (UE) 115 may be operating within cell 105, while UE 116 may be operating within cell 106. Each UE needs to transmit signal in an uplink (UL) to its serving eNB. In addition, each UE has an equal received signal-to-noise ratio (SNR) at a corresponding serving. Furthermore, each UE is transmitting with power P. FIG. 1*b* illustrates a sector diagram 150 of a wireless access system with three eNBs.

Although the following discussion focuses on a wireless access system with a three sector configuration, the embodiments discussed herein may be operable with wireless access systems with other configurations. Therefore, the discussion of a three sector configuration should not be construed as being limiting to either the spirit or the scope of the embodiments.

If wireless access system 100 is using reuse-1, then a combined channel capacity may be expressed as:

$$C_{reuse-1} = 2\log\left(1 + \frac{P|h|^2}{\sigma_n^2 + \sigma_I^2}\right). \quad (1.1)$$

For orthogonal access, e.g., Time Division Multiplexing (TDM), the channel capacity may be expressed as:

$$C_{orth} = \log\left(1 + \frac{2P|h|^2}{\sigma_n^2}\right). \quad (1.2)$$

The SNR may be defined as:

$$\gamma = \frac{P|h|^2}{\sigma_n^2}, \quad (1.3)$$

and Interference over Thermal Noise (IoT) may be defined as:

$$\delta = \frac{\sigma_I^2}{\sigma_n^2}. \quad (1.4)$$

Then Equation (1.1) may be re-written as:

$$C_{reuse-1} = 2\log\left(1 + \frac{\gamma}{1+\delta}\right), \quad (1.5)$$

and Equation (1.2) becomes:

$$C_{orth} = \log(1+2\gamma). \quad (1.6)$$

By solving $$C_{reuse-1} = C_{orth}, \quad (1.7)$$

it is possible to get:

$$\delta = \frac{\gamma}{\sqrt{1+2\gamma}-1} - 1. \quad (1.8)$$

Equation (1.8) may be referred to as Criteria A.

Resource allocation and scheduling of UL transmissions of the two UEs (UE 115 and UE 116) in the two cells (cell 105 and cell 106) shown in FIG. 1 may be considered in terms of wireless access system throughput and capacity. For example, referencing the two UEs, it may be determined whether the two UEs may be able to transmit using the same resource (reuse-1) or not (non-reuse-1). A combined throughput or capacity may be used as a comparison metric. For example, if the combined throughput of the two UEs (implying that the two UEs are using reuse-1) is larger than the throughput of a single UE (implying that non-reuse-1 is being used), then the two UEs can transmit using the same resource and may be scheduled independently by their respective eNBs.

Equation (1.8) may be a simplification of the comparison of the combined throughput and capacity. An eNB may apply Equation (1.8) to all UEs that it serves and eventually, the UEs can be classified as being one of two groups (either CCUs or CEUs).

Figure 2:
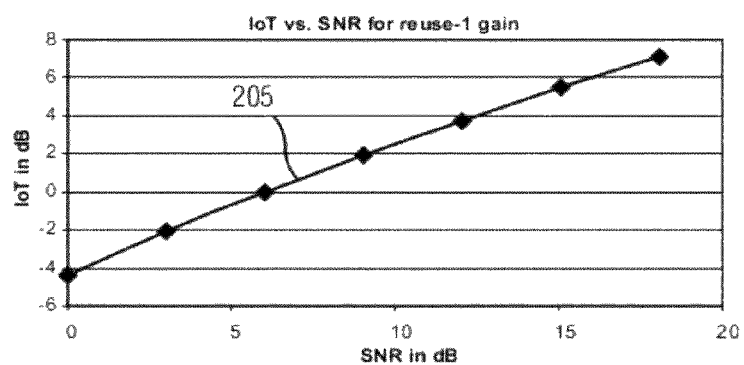
FIG. 2 is a data plot of Signal-to-Noise Ratio (SNR) versus Interference over Thermal Noise (IoT)

For a given $\gamma$, if the IoT caused by reuse-1 is larger than $\delta$, then reuse-1 loses system capacity. Otherwise, reuse-1 gains system capacity. FIG. 2 illustrates a relationship between $\gamma$ and $\delta$ (line 205). The relationship between $\gamma$ and $\delta$ is substantially linear in the log domain. Meaning that the gain of reuse-1 comes primarily from the UEs that cause little IoT to each other. Therefore, reuse-1 operates best for CCUs. However, for CEUs, whose SNR is already low, little IoT may be tolerated.

If the SNR and the IoT caused to a sector in wireless access system 100 is below line 205, then the UE is a CCU relative to the sector, while if the SNR and the IoT caused to the sector is above line 205, then the UE is a CEU relative to the sector.

If a bias weighting factor is used to provide more flexibility in terms of user classification, then Equation (1.7) may be modified to:

$$C_{reuse-1} = C_{orth} + \log \alpha. \quad (1.9)$$

Therefore, $$\delta = \frac{\gamma}{\sqrt{\alpha(1+2\gamma)}-1} - 1. \quad (1.10)$$

Figure 3A:
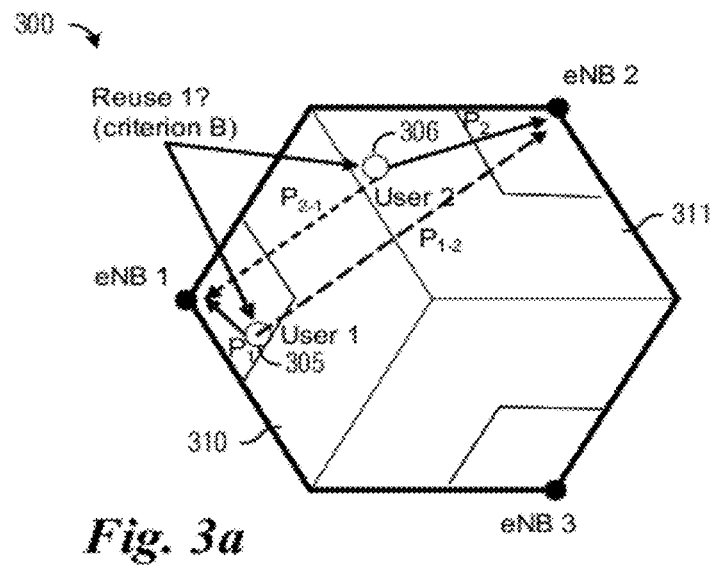
FIG. 3a is a sector diagram of a wireless access system.

FIG. 3a illustrates a sector diagram of a wireless access system 300. Wireless access system 300 includes two UEs (User 1 305 and User 2 306) located in two neighboring cells, with User 1 305 operating in cell 310 and User 2 306 operating in cell 311. Each UE reports back its own RSRP. Let $\gamma_0 = P_s/\sigma_n^2$ be the SNR of a user and $\eta_{i \to j} = P_{i \to j}/\sigma_n^2$ be the IoT caused by user i to user j.

For cell 310, from its received RSRP and its measured power $P_1$, cell 310 will be able to estimate $P_{1 \to 2}$ as:

$$P_{1 \to 2} = p_1 \frac{P_{UE-1,cell-2}^{RSRP}}{P_{UE-1,cell-1}^{RSRP}}. \quad (2.1)$$

Similarly, cell 311 will be able to estimate $P_{2 \to 1}$ from its received RSRP and its measured $P_2$.

Assume that each cell knows its noise level $\sigma_n^2$ (noise and interference minus the main interference under consideration). Further, assume that UL power control is perfect, so that $P_1 \approx P_2 = P_s$. Then, given $P_1$ and $P_{1 \to 2}$, what should the relation of $P_2$ and $P_{2 \to 1}$ be to pair the two UEs, i.e., have the two UEs transmit over the same frequency band at the same time?

This relationship may be expressed as:

$$\left(1 + \frac{P_s}{\sigma_n^2 + P_{2 \to 1}}\right)\left(1 + \frac{P_s}{\sigma_n^2 + P_{1 \to 2}}\right) > \left(1 + \frac{P_s}{\sigma_n^2}\right), \quad (2.2)$$

which may be re-written as:

$$\eta_{2 \to 1} < \frac{1 + \gamma_0}{\eta_{1 \to 2}}, \quad (2.3)$$

where $\gamma_0 = P_s/\sigma_n^2$, and $\eta_{i \to j} = P_{i \to j}/\sigma_n^2$.
Relation (2.3) may be re-written as:

$$\eta_{1 \to 2}\eta_{2 \to 1} < 1 + \gamma_0. \quad (2.4)$$

Relation (2.3) may used as Criteria B: If $\eta_{1 \to 2}\eta_{2 \to 1} < 1 + \gamma_0$, then the two UEs can transmit using the same resource (reuse-1); otherwise, the two UEs shouldn't transmit at the same time if the total throughput needs to be maximized. If a bias weighting factor is to be used, then Criteria B may be modified accordingly.

Once again, combined throughput and capacity may be used to perform resource allocation and scheduling of UL transmissions of UEs operating in cells. Consider two UEs that are not necessarily equi-distant away from their respective serving eNBs. There may be a need to decide whether the two UEs may transmit using the same resource (i.e., reuse-1) or not (i.e., non-reuse-1). Throughput and capacity may be used given a UL SNR of a UE and IoT caused by the UE to the other eNB. If the total throughput of the two UEs is larger than that of a single UE, then the two UEs may use the same resource to transmit (reuse-1), otherwise the two UEs can not use the same resource to transmit (non-reuse-1).

Figure 3B:
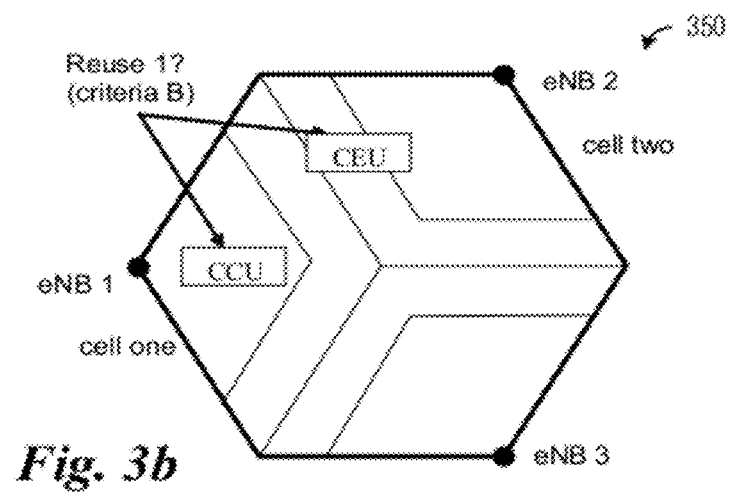
FIG. 3b is a sector diagram of a wireless access system, wherein wireless access system makes use of two-ring FFR resource allocation plan.

FIG. 3b illustrates a sector diagram of a wireless access system 350, wherein wireless access system 350 makes use of two-ring FFR. When Criteria B is used for two-ring FFR, $\eta_{1 \to 2}$ should be a median or average value of the interference caused by all CCUs of sector one (cell one) to sector two (cell two), and $\eta_{2 \to 1}$ should be a median or average value of interference caused by all CEUs of sector two (cell two) to sector one (cell one).

Figure 4:
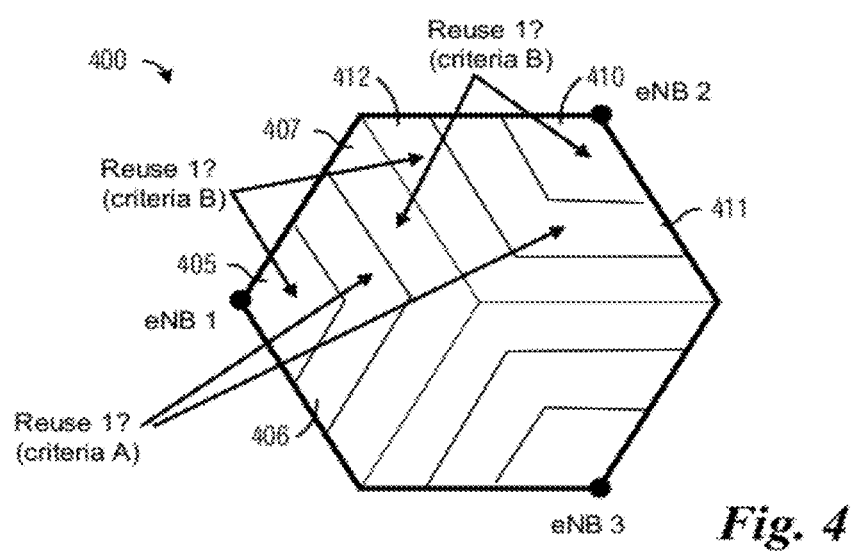
FIG. 4 is a sector diagram of a wireless access system, wherein wireless access system makes use of multiple-ring FFR (three-ring FFR) resource allocation plan.

FIG. 4 illustrates a sector diagram of a wireless access system 400, wherein wireless access system 400 makes use of multiple-ring FFR (three-ring FFR). A sector (or cell) may obtain a SNR distribution based on reported downlink (DL) pilot measurements made by UEs and the measurement of UL pilot made by the eNB itself. If the range of SNR is larger than a threshold (S), then the sector divides the UEs into more than two (e.g., N) groups and uses Criteria B to determine whether multiple-ring FFR may be implemented. This may be referred to as Criteria C. When Criteria B is used for multiple-ring FFR, $\eta_{i \to j}$ should be a median or average value of users in corresponding rings (UE groups).

If the SNR statistics of UEs being served by an eNB are larger than a threshold, the UEs may be classified into multiple groups. Then, using the SNR and IoT statistics of the UEs may be used by the eNBs to determine a particular multiple-ring FFR to be used. For example, Criteria A and Criteria B may be used to determine the particular multiple-ring FFR to be used.

If multiple-ring FFR may be implemented, then Criteria A and Criteria B may be used to determine if reuse-1 should be used. For example, Criteria B may be used to determine if UEs in group 405 and group 412 should use reuse-1, Criteria B may also be used to determine if UEs in group 407 and group 410 should use reuse-1, while Criteria A may be used to determine if UEs in group 406 and group 411 should use reuse-1.

Figure 5A:
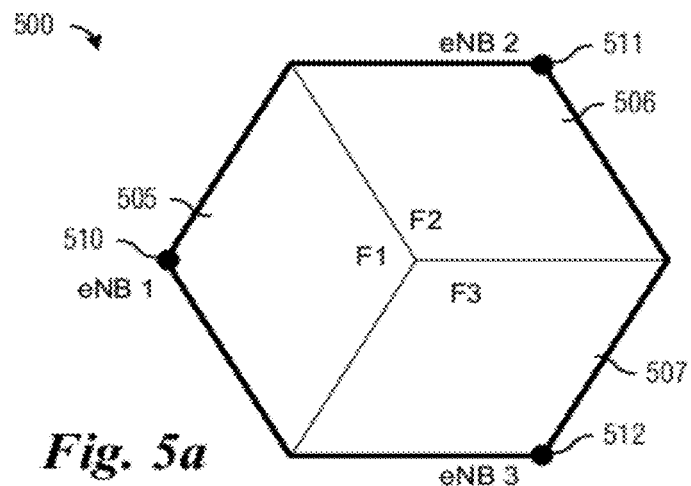
FIG. 5a is a sector diagram of a wireless access system, wherein wireless access system 500 uses reuse-3 resource allocation plan.

FIG. 5a illustrates a sector diagram of a wireless access system 500, wherein wireless access system 500 uses reuse-3 as its ICIC plan. As shown in FIG. 5a, in a sector 505 of eNB 1 510 UL transmissions uses a subband F1, in a sector 506 of eNB 2 511 UL transmissions uses a subband F2, and in a sector 507 of eNB 3 512 UL transmissions uses a subband F3, with F1, F2, and F3 being different subbands. Since the subbands are different, UL transmissions in the different sectors do not interfere.

Figure 5B:
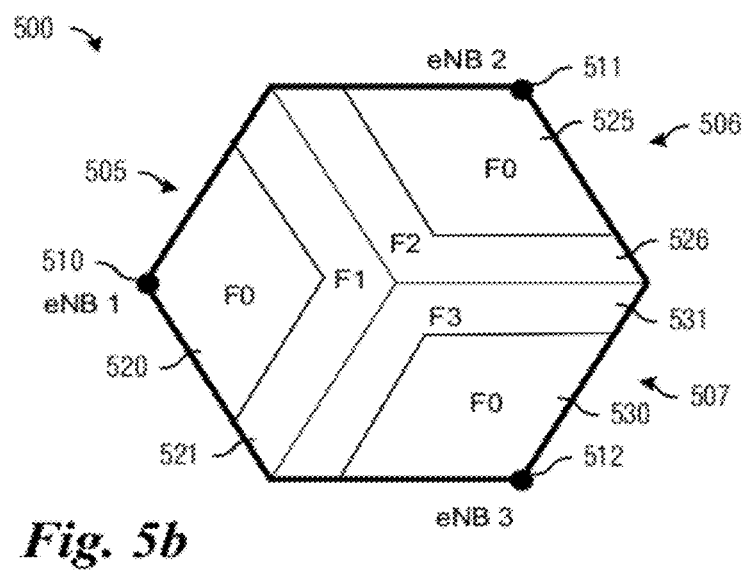
FIG. 5b is a sector diagram of a wireless access system, wherein wireless access system uses a multiple reuse system, with a combination of reuse-1 and reuse-3, resource allocation plan.

FIG. 5b illustrates a sector diagram of a wireless access system 500, wherein wireless access system 500 uses a multiple reuse system, with a combination of reuse-1 and reuse-3, as its ICIC plan. UEs operating in each sector of a single eNB may be partitioned into two groups, a CCU and CEU. For example, UEs in sector 505 of eNB 510 may be partitioned into a CCU group if they are located in area 520 or a CEU group if they are located in area 521. Similarly, UEs in sector 506 of eNB 511 and sector 507 of eNB 512 may be partitioned into a CCU group if they are in located in area 525 or area 530 or a CEU group if they are located in area 526 or area 531. UEs operating in areas 520, 525, and 530 may use reuse-1 since they are widely separated. However, UEs operating in areas 521, 526, and 531 may use reuse-3 to reduce interference because they are closely located.

Figure 5C:
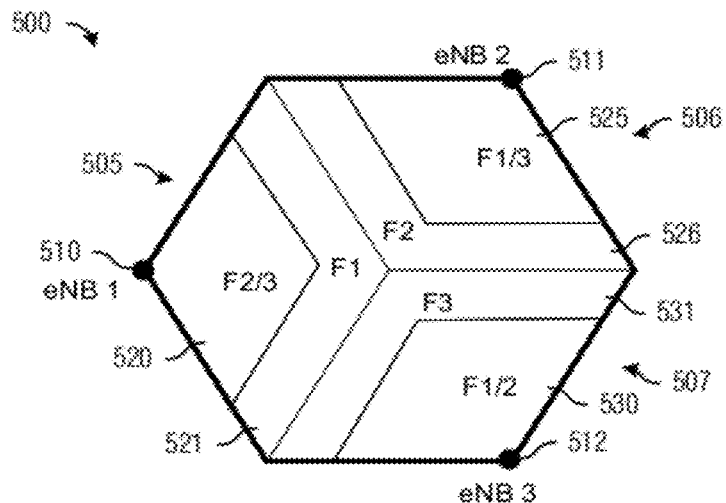
FIG. 5c is a sector diagram of a wireless access system, wherein wireless access system uses a two-ring FFR system resource allocation plan.

FIG. 5c illustrates a sector diagram of a wireless access system 500, wherein wireless access system 500 uses a two-ring FFR system as its ICIC plan. The two-ring FFR system as shown in FIG. 5c may have a similar layout to the multiple reuse system shown in FIG. 5b. However, the subbands used by the different groups may be different. For example, UEs operating in areas 520, 525, and 530 may use reuse-2 to help reduce interference to UEs operating in areas 521, 526, and 531, respectively. UEs operating in areas 521, 526, and 531 may use reuse-3 to reduce interference because they are closely located.

For example, if UEs operating in areas 521, 526, and 531 are using subbands F1, F2, and F3, respectively, then UEs operating in areas 520, 525, and 530 may use subbands F2&F3, F1&F3, and F1&F2, respectively, to reduce interference.

Figure 5D:
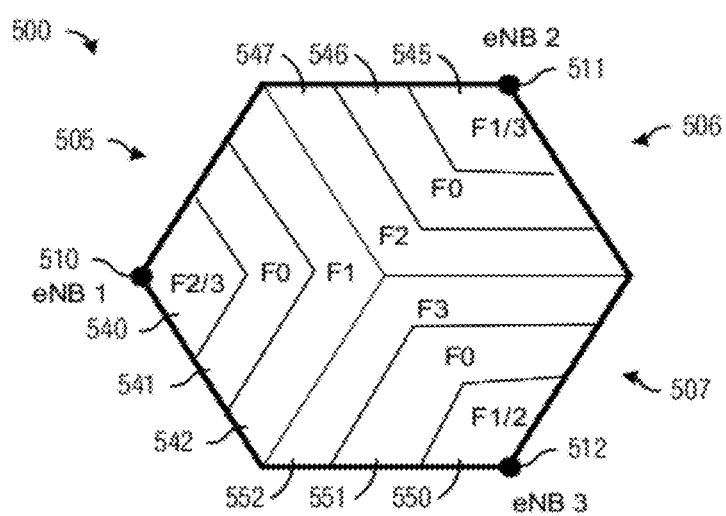
FIG. 5d is a sector diagram of a wireless access system, wherein wireless access system uses a three-ring FFR system resource allocation plan.

FIG. 5d illustrates a sector diagram of a wireless access system 500, wherein wireless access system 500 uses a three-ring FFR system as its ICIC plan. Within a single sector, UEs may be partitioned into three groups. For example, UEs operating in sector 505 of eNB 510 may be partitioned into groups depending on their location, such as areas 540, 541, and 542. Similarly, UEs operating in sector 506 of eNB 511 and sector 507 of eNB 512 may be partitioned based on their location, such as areas 545, 546, and 547 and areas 550, 551, and 552.

A multiple reuse plan may be implemented to reduce interference. For example, UEs operating in areas 540, 545, and 550 may use reuse-2 with subbands F2&F3, F1&F3, and F1&F2, respectively. While UEs operating in areas 541, 546, and 551 may use reuse-1 (subband F0), and UEs operating in areas 542, 547, and 552 may use reuse-3 (subbands F1, F2, and F3, respectively).

Figure 6:
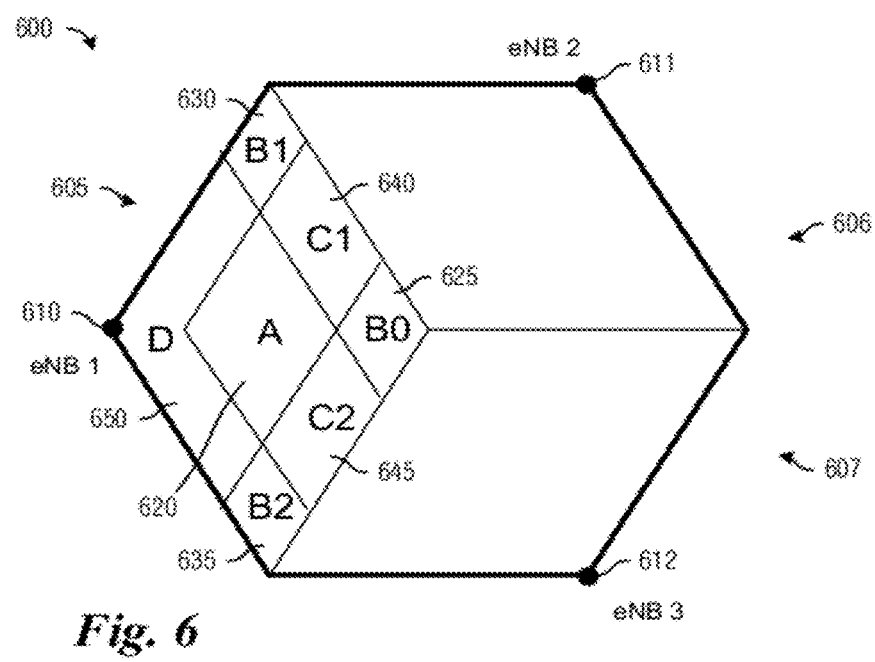
FIG. 6 is a sector diagram of a wireless access system.

FIG. 6 illustrates a sector diagram of a wireless access system 600. As shown in FIG. 6, a pattern is drawn in a sector 605 of eNB 610 for use in classifying UEs operating in sector 605. Similar patterns may be drawn for other sectors (e.g., sectors 606 and 607) of wireless access system 600 but are omitted to maintain simplicity and clarity. Sector 605 has two inter-eNB neighbor eNBs: eNB 611 and eNB 612 and two inter-eNB neighbor sectors: sector 606 and sector 607. Sector 605 also has two intra-eNB neighbor sectors, which are served by eNB 610.

Using Criteria A, a UE operating in sector 605 may be categorized into one of multiple groups of UEs. A first group 620 (group A) is made up of UEs that are CCUs. A UE in first group 620 is a CCU relative to four (4) neighboring sectors (sectors 606 and 607 as well as two remaining sectors of eNB 610). A second group 625 (group B0) is made up of UEs that are CEUs relative to more than two sectors, for example, sectors 606 and 607. A third group 630 (group B1) and a fourth group 635 (group B2) are similarly defined.

A fifth group 640 (group C1) and a sixth group 645 (group C2) is made up of UEs that are CEU relative to a different eNB. For example, UEs in fifth group 640 are CEU relative to sector 606 of eNB 611. A seventh group 650 (group D) is made up of UEs that are CEU relative to the same eNB. For example, UEs in seventh group 640 are CEU to the two remaining sectors of eNB 610.

The classification of a UE may make use of several different options, depending on the type of wireless access system (synchronized or unsynchronized system). For either synchronized or unsynchronized systems, the UEs measure the strength of a DL common pilot signal (P) and report it to the eNB. The eNB may then measure the UL reference sequence (a sounding or traffic channel, for example) of each UE that it is serving and estimates the possible interference to each neighboring eNB. The estimates may be relative difference to the reported DL common pilot signal strength provided by the UEs. Then, using Criteria A, the UEs may be categorized as one of the above discussed groups.

For synchronized systems, neighboring eNB monitoring may be employed. Neighboring eNB monitoring may also be used in intra-eNB sector monitoring. A technique based on a UE's RSRP (obtained from initial ranging, handover, or estimated by the eNB based on a received UL SNR of the UE) may be as follows: when the eNB schedules a UL transmission for the UE, the eNB sends a monitoring request message to neighboring eNBs that are at the top of the RSRP provided by the UE asking the neighboring eNBs to monitor the UL transmission of the UE. The monitoring request message may include resource and reference sequence indices for the UE.

At the time of the scheduled UL transmission of the UE, the neighboring eNBs may monitor the corresponding resource and reference sequence indices and calculate the interference caused by the UE. The neighboring eNBs may make use of correlation and filtering techniques. The neighboring eNBs may then report the measured interference to the eNB. The eNB may then decide how to categorize the UE. The categorization may be based on a throughput based formula, for example, such as Criteria A, B, or C. The channel quality information (CQI) report from the UE may be used as a trigger for the eNB to send a RSRP reporting request to the UE.

Figure 7:
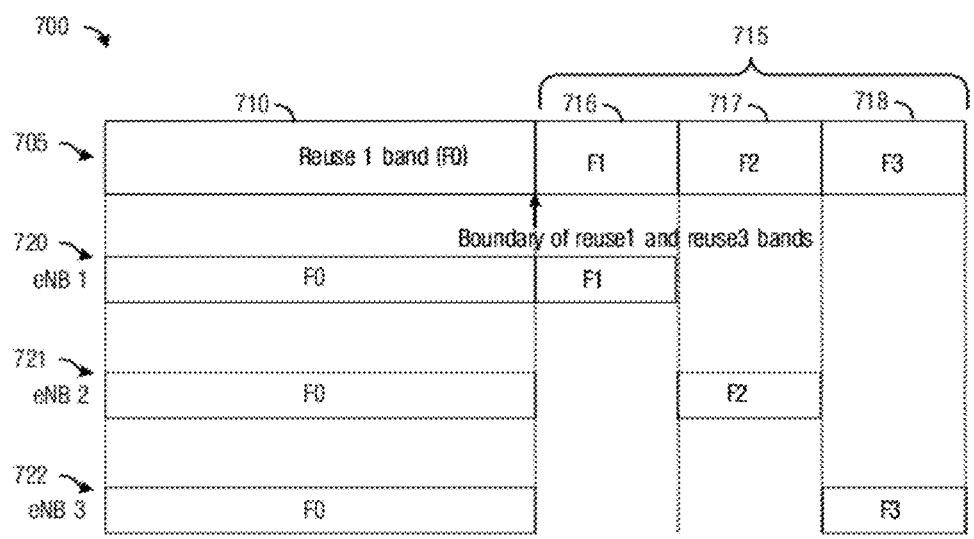
FIG. 7 is a frequency usage diagram for a reuse-1 and reuse-3 resource allocation plan.

FIG. 7 illustrates a frequency usage diagram 700 for a reuse-1 and reuse-3 ICIC plan. Frequency band 705 represents a frequency allocation for a UL of a wireless access system. A first portion 710 may be allocated for reuse-1 usage and a second portion 715 may be allocated for reuse-3 usage, with sub-portions 716, 717, and 718 allocated to subbands F1, F2, and F3, respectively.

Frequency band 720 represents subband usage of UEs in a first eNB, frequency band 721 represents subband usage of UEs in a second eNB, and frequency band 722 represents subband usage of UEs in a third eNB. While in first portion 710, UEs from all three eNBs may transmit. However, in second portion 715, only UEs from one eNB may be allowed to transmit at a given time.

For UL scheduling, each sector may independently schedule all inter-eNB CEUs (groups B0, B1, B2, C1, and C2) using reuse-3 bands.

Figure 8:
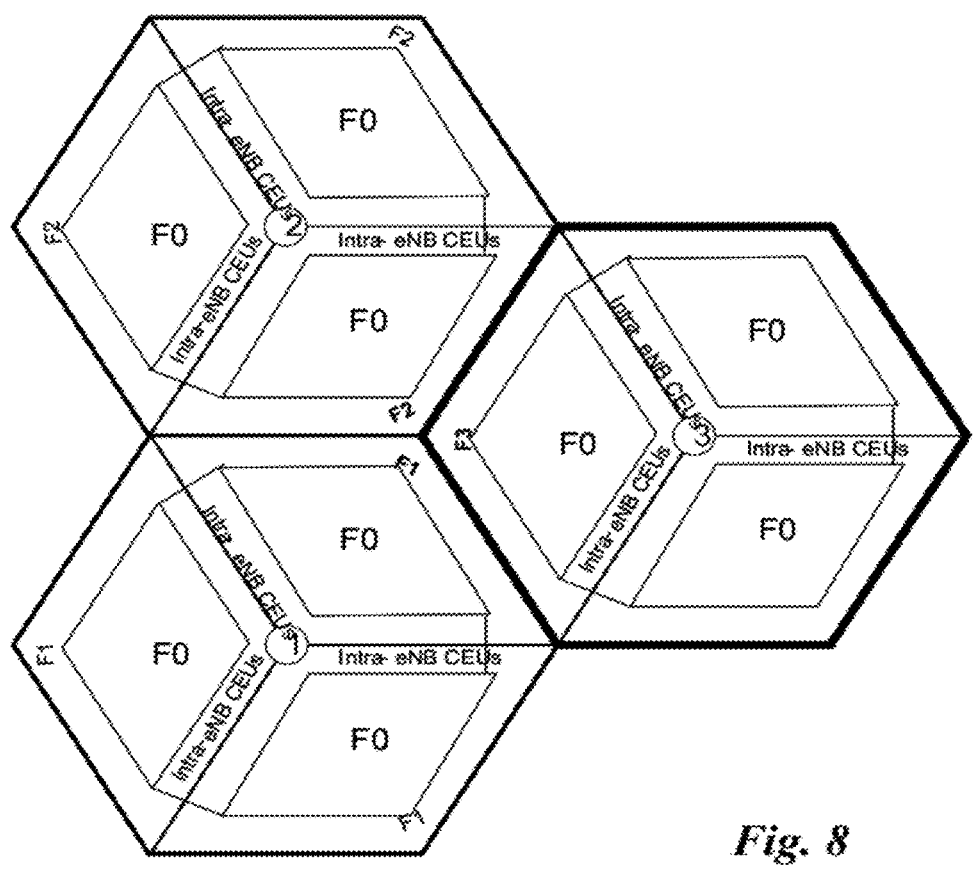
FIG. 8 is a sector diagram of a wireless access system, wherein wireless access system makes use of the reuse-1 and reuse-3 resource allocation plan of FIG. 7.

FIG. 8 illustrates a sector diagram of a wireless access system 800, wherein wireless access system 800 makes use of the reuse-1 and reuse-3 ICIC plan discussed in FIG. 7. Shown in FIG. 8 are exemplary partitioning of UEs and subband allocations. The eNBs shown in FIG. 8 may make use of F1, F2, and F3 to schedule group B0, B1, B2, C1, and C2 UEs.

Figure 9:
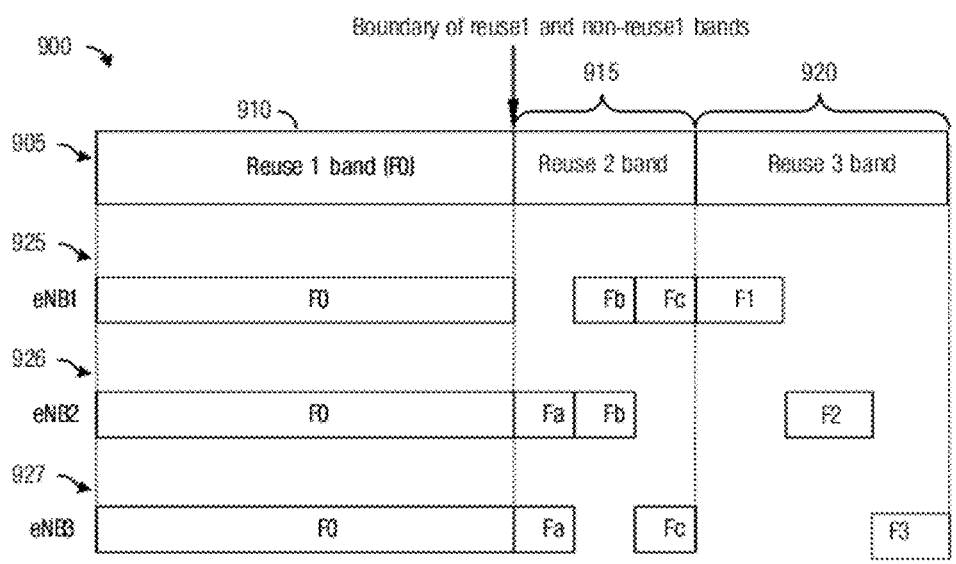
FIG. 9 is a frequency usage diagram for a reuse-1, reuse-2, and reuse-3 resource allocation plan.

FIG. 9 illustrates frequency usage diagram 900 for a reuse-1, reuse-2, and reuse-3 ICIC plan. Frequency band 905 represents a frequency allocation for a UL of a wireless access system. A first portion 910 may be allocated for reuse-1 usage, a second portion 915 may be allocated for reuse-2 usage, and a third portion 920 may be allocated for reuse-3 usage.

Frequency band 925 represents subband usage of UEs in a first eNB, frequency band 926 represents subband usage of UEs in a second eNB, and frequency band 927 represents subband usage of UEs in a third eNB. While in first portion 910, UEs from all three eNBs may transmit. However, in second portion 915, only UEs from two eNBs may be allowed to transmit at a given time and in third portion 920, only UEs from one eNB may be allowed to transmit at a given time.

It may be possible to negotiate the use of a reuse-2 portion of a frequency band. An eNB may select one of three reuse-2 frequency bands to schedule groups B1, B2, C1, and C2 UEs. For example, a first eNB may send a first High Interference Indicator (HII) message to a second eNB (a neighboring eNB) to indicate an index of reuse-2 frequency band (for example, 1, 2, or 3). The second eNB may respond with a second HII message that either agrees or disagrees with the first eNB. If the second eNB agrees, then the second HII message may include the same index as transmitted in the first HII message. If the second eNB disagrees, then the second HII message may include a different index or an index zero (0).

For UL scheduling, each sector can independently schedule UEs in group B by using the reuse-3 frequency bands. Then, after negotiating with neighboring eNBs for reuse-2 frequency band usage, each sector can independently schedule UEs in groups C1 and C2 and potentially some group B1 and B2 UEs by using the reuse-2 frequency bands. The scheduling may be based on UE priority. For example, the UE's group may be used to select a corresponding frequency band. The scheduling of UEs may continue until all resources are allocated. It may also be possible to swap resources within a sector. For example, a UE that is supposed to use a reuse-1 frequency band (group A UE) can use reuse-3 frequency band. Additionally, a UE that is supposed to use a reuse-2 frequency band (groups C1 and C2) can use reuse-3 frequency band, and a UE that is supposed to use a reuse-1 frequency band (group A) can use reuse-2 frequency band.

Figure 10:
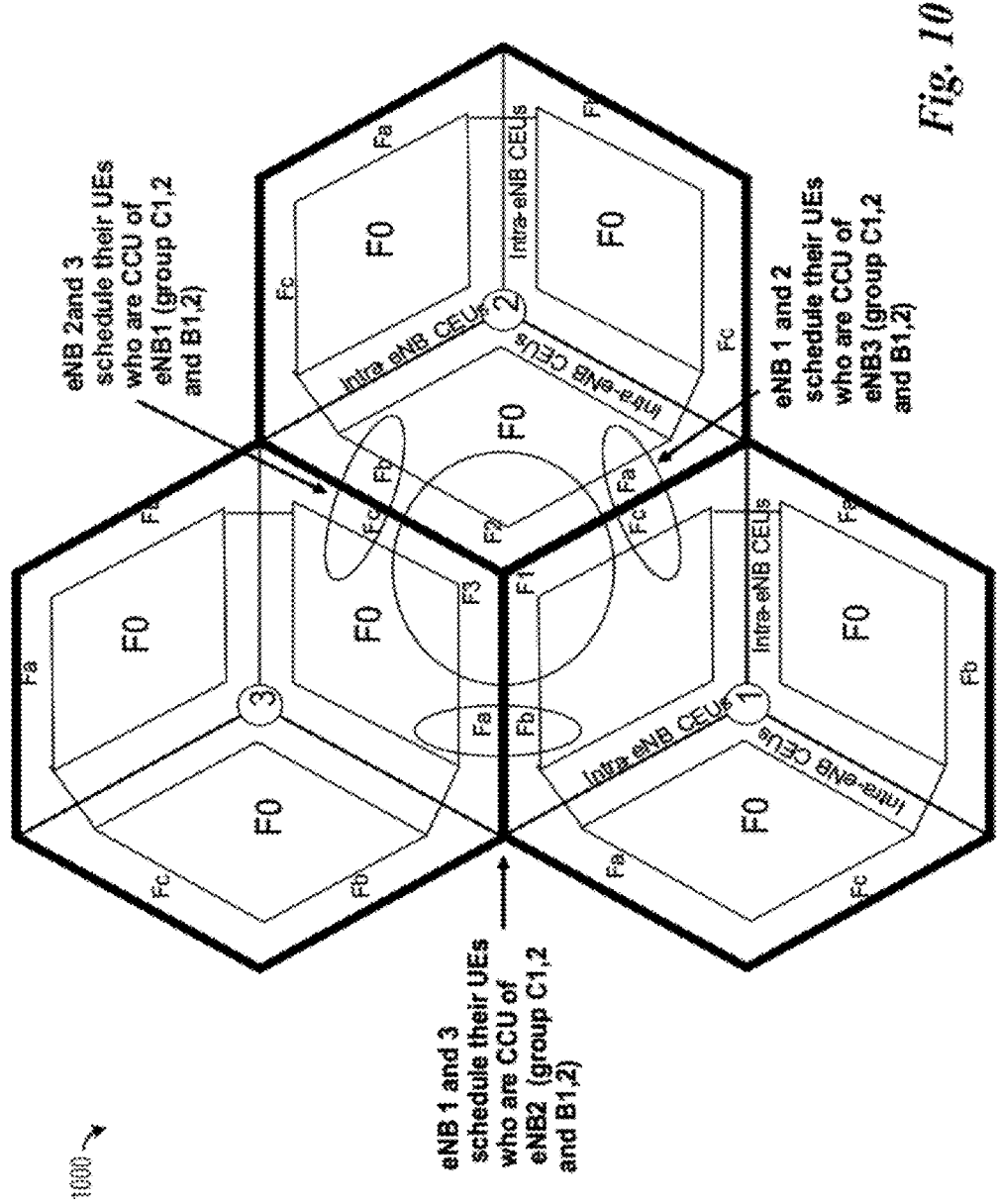
FIG. 10 is a sector diagram of a wireless access system, wherein wireless access system makes use of the reuse-1, reuse-2, and reuse-3 resource allocation plan of FIG. 9.

FIG. 10 illustrates a sector diagram of a wireless access system 1000, wherein wireless access system 1000 makes use of the reuse-1, reuse-2, and reuse-3 ICIC plan discussed in FIG. 9. Shown in FIG. 10 are exemplary partitioning of UEs and subband allocations. As shown in FIG. 10, eNBs 1 and 3 may schedule their UEs that are CCU of eNB 2 (groups C1, C2, B1, and B2), eNBs 2 and 3 may schedule their UEs that are CCU of eNB 1 (groups C1, C2, B1, and B2), and eNBs 1 and 2 may schedule their UEs that are CCU of eNB 3 (groups C1, C2, B1, and B2).

Figure 11:
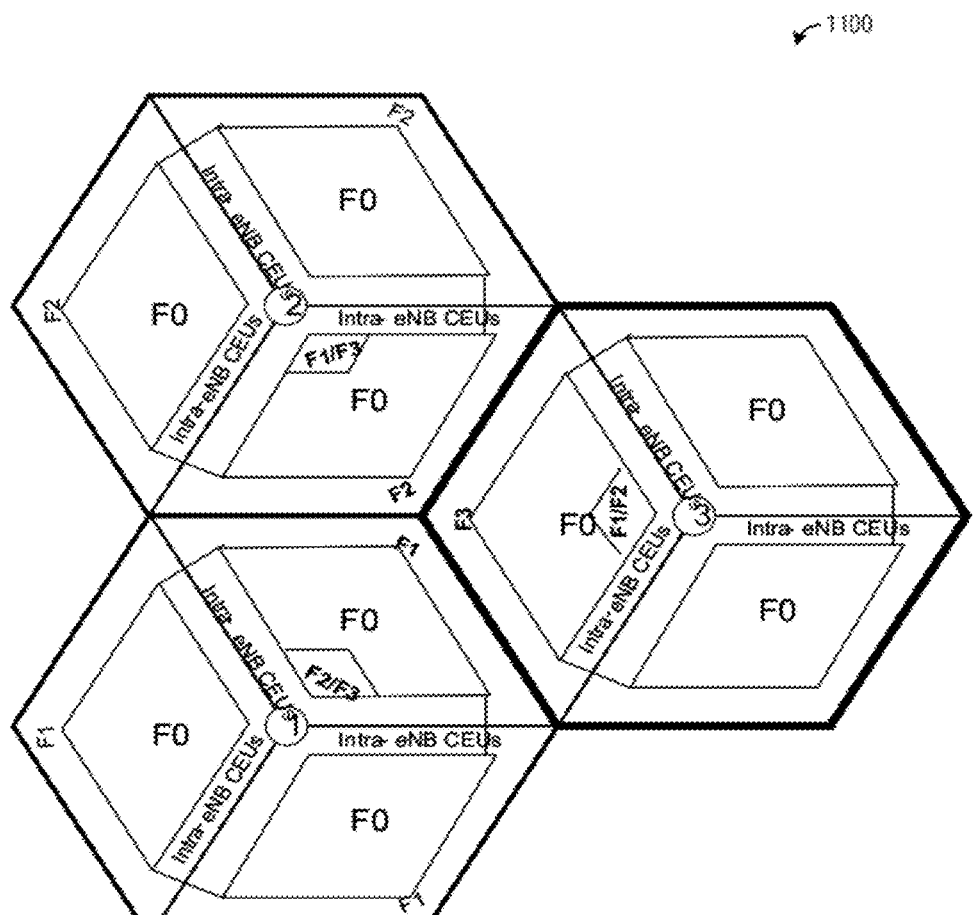
FIG. 11 is a sector diagram of a wireless access system, wherein wireless access system makes use of a three-ring FFR resource allocation plan.

FIG. 11 illustrates a sector diagram of a wireless access system 1100, wherein wireless access system 1100 makes use of a three-ring FFR ICIC plan. In wireless access system 1100, a reuse-3 frequency band may be reused by a neighbor sector of a different eNB to schedule UEs that are close to the center (based on Criteria B & C).

In an embodiment, reuse-2 may be combined with any of the ICIC plans shown in FIGS. 5a through 5d.

A ratio of reuse-1 to non-reuse-1 operation may be computed. A universal reuse ratio may be specified, for example 1:1. Adjusting the ratio may be possible, but it may be desired that the reuse ratio be changed slowly so that instability not be introduced into the wireless access system. For example, as system load changes from heavy to light, the reuse ratio (reuse-1 to non-reuse-1) may be reduced. A reduction in the reuse ratio may reduce power consumption in a UE, which may lead to longer battery life as well as increased power efficiency. Furthermore, as system load changes from light to heavy, the reuse ratio may be increased to increase spectrum efficiency.

Figure 12:
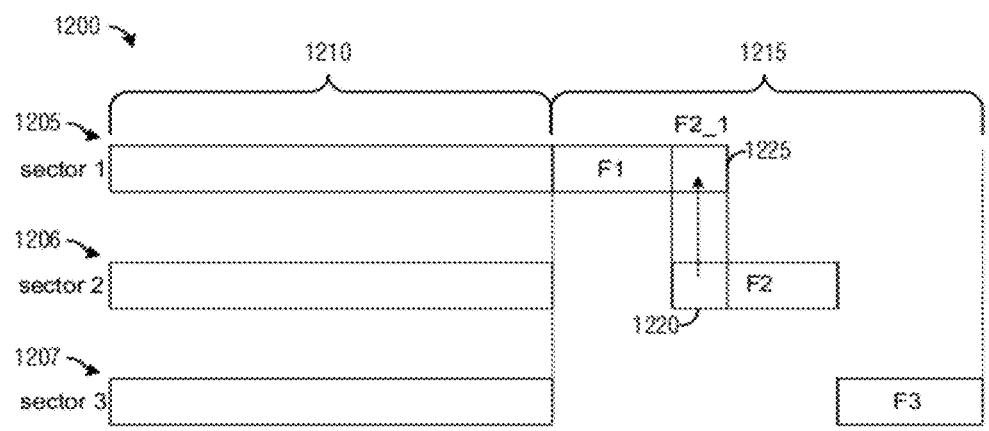
FIG. 12 is a frequency usage diagram for a reuse-1 and reuse-2 ICIC plan that allows for a swapping of resource allocations for sectors of an eNB.

FIG. 12 illustrates a frequency usage diagram 1200 for a reuse-1 and reuse-3 ICIC plan that allows for a swapping of resource allocations for sectors of an eNBs. In a wireless access system, a situation may arise wherein one sector of an eNB requires more resource allocations than its other sectors. For example, UEs in a first sector may be involved in operations that need a lot of resources. In such a situation, it may be possible to increase the resource allocation to the sector by correspondingly reducing resource allocations to one or more of the other sectors. Although the discussion focuses on exchanging resource allocations for sectors of a single eNB, a similar technique may be applied to neighboring eNBs. Therefore, the discussion of swapping resource allocations for sectors of a single eNB should not be construed as being limiting to either the scope or the spirit of the embodiments.

As shown in FIG. 12, frequency band 1205 represents subband usage of UEs in a first sector, frequency band 1206 represents subband usage of UEs in a second sector, and frequency band 1207 represents subband usage of UEs in a third sector. A first portion 1210 represents frequency allocations for reuse-1 usage and a second portion 1215 represents frequency allocation for reuse-3 usage. Since during first portion 1210, UEs located in any of the three sectors may transmit, resource allocation swapping is not necessary.

However, in second portion 1215, UEs in a single sector may transmit only during a fraction of the portion. Therefore, there may not be sufficient resources to meet the requirements of the UEs. In this case, resources previously assigned to a sector that is lightly loaded may be reassigned to a sector that is heavily loaded. For example, as shown in FIG. 12, resources previously assigned to second sector (block 1220) may be reassigned to first sector (block 1225). The second sector may request that its resource allocation be restored if its needs require the reallocated resources.

Figure 13:
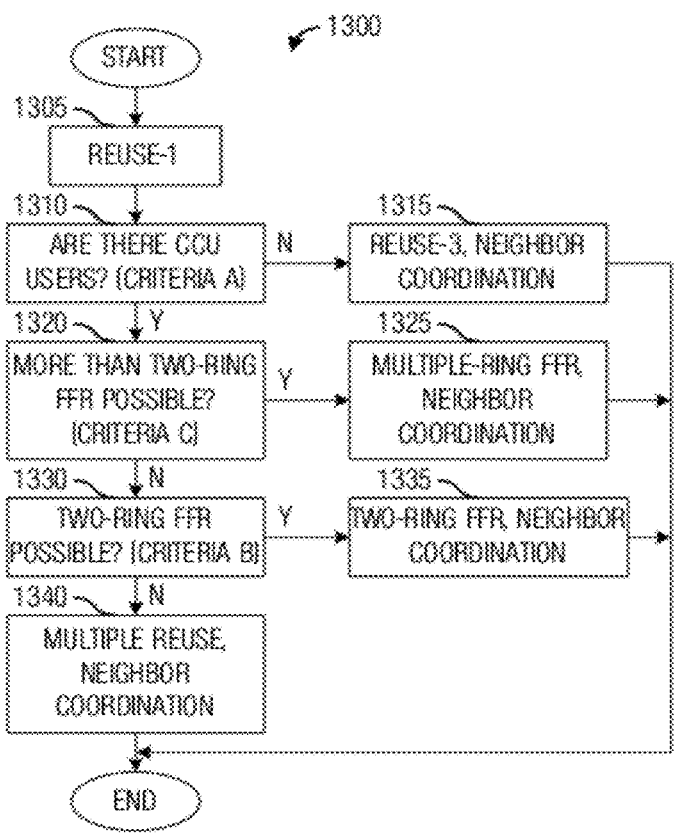
FIG. 13 is a flow diagram of operations in selecting an ICIC plan for a wireless access system.

FIG. 13 illustrates a flow diagram of operations 1300 in selecting an ICIC plan for a wireless access system. Operations 1300 may be indicative of operations taking place in eNBs of a wireless access system. Operations 1300 may occur at system power up, after system reset, or so forth. Furthermore, operations 1300 may occur if a measured performance of the wireless access system is below a threshold. For example, if system throughput is lower than expected, UE delay is greater than expected, frame error rate (or bit error rate, block error rate, and so forth) is greater than expected, and so on.

The selecting of an ICIC plan for the wireless access system may start with a default plan, such as reuse-1 (block 1305). A check may be performed to determine if there are any CCU users (block 1310). This may be an application of Criteria A. If there are no CCU users, then a reuse-3 ICIC plan with neighbor coordination may be selected (block 1315) and operations 1300 may terminate.

If there are CCU users, then a check may be performed to determine if more than two-ring FFR may be possible (block 1320). This may be an application of Criteria C. If more than two-ring FFR may be possible, then multiple-ring FFR with neighbor coordination may be selected as an ICIC plan (block 1325) and operations 1300 may terminate.

If more than two-ring FFR is not possible, then a check may be performed to determine if two-ring FFR is possible (block 1330). This may be an application of Criteria B. If two-ring FFR is possible, then two-ring FFR with neighbor coordination may be selected as an ICIC plan (block 1335) and operations 1300 may terminate.

If two-ring FFR is not possible, then multiple reuse with neighbor coordination is selected as an ICIC plan (block 1340) and operations 1300 may terminate.

Figure 14:
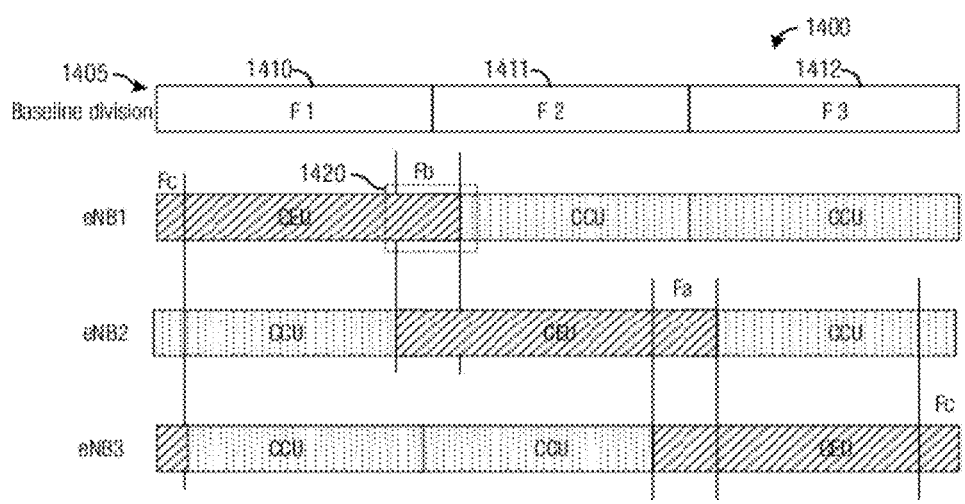
FIG. 14 is a frequency usage diagram for a two-ring FFR and reuse-2 resource allocation plan.

FIG. 14 illustrates a frequency usage diagram 1400 of a two-ring FFR and reuse-2 ICIC plan of a wireless access system. As shown in FIG. 14, a frequency band 1405 may be divided into three baseline frequency bands 1410, 1411, and 1412. Each of the baseline frequency bands may be assigned to one of neighboring sectors for use in allocating resources to their respective edge UEs, i.e., CEUs. Each of the baseline frequency bands may also be used by the neighboring sectors to allocate their center UEs, i.e., CCUs. For example, if a first sector uses a baseline frequency band for its edge UEs, then the remaining two sectors may use the baseline frequency band for its center UEs.

There may be some overlap, such as overlap 1420 (labeled Fb), between a baseline frequency band being used for edge UEs and a baseline frequency band being used for center UEs. Other overlaps may be labeled Fa and Fc. The overlaps may be used as reuse-2 portions of the frequency band. For example, each sector of the three neighboring sectors may use two parts of each overlap (Fa, Fb, and Fc, respectively). The overlap may be used to schedule transmissions for UEs in groups B1, B2, C1, and C2. Additionally, the usage of the reuse-2 portions for each sector may be negotiated between neighboring eNBs.

Figure 15:
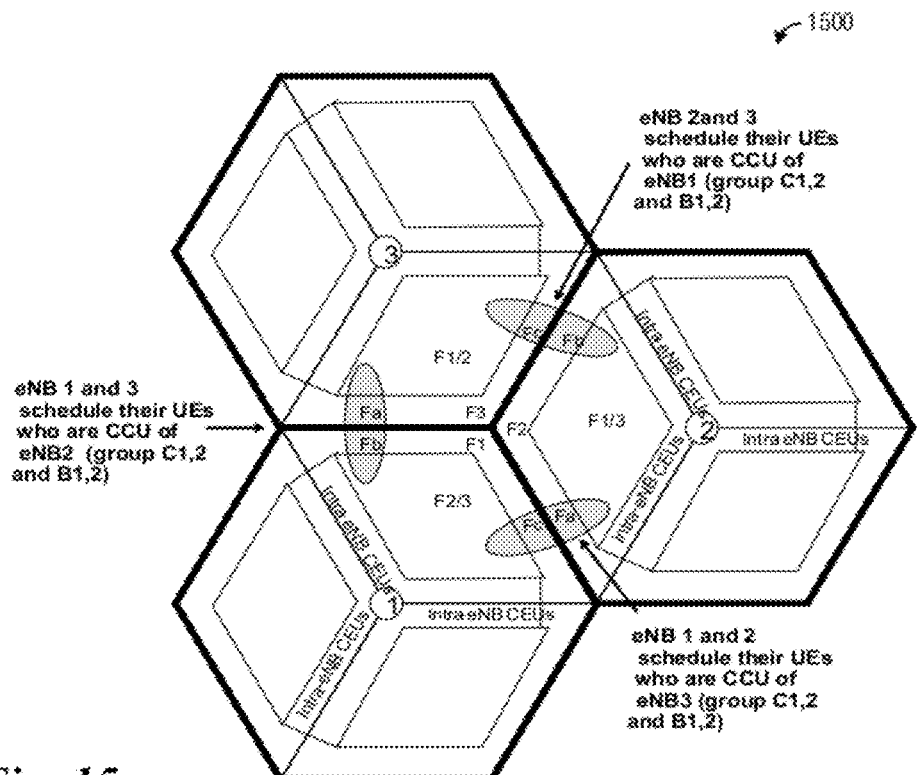
FIG. 15 is a sector diagram of a wireless access system, wherein wireless access system makes use of the two-ring FFR and reuse-2 resource allocation plan of FIG. 14.

FIG. 15 illustrates a sector diagram of a wireless access system 1500, wherein wireless access system 1500 makes use of a two-ring FFR and reuse-2 ICIC plan. In wireless access system 1500, eNB 1 and eNB 3 may schedule their UEs (group C1, C2, B1, and B2 UEs) that are CCU of eNB 2, eNB 2 and eNB 3 may schedule their UEs (group C1, C2, B1, and B2 UEs) that are CCU of eNB 1, and eNB 1 and eNB 2 may schedule their UEs (group C1, C2, B1, and B2 UEs) that are CCU of eNB 3.

In UL MU-MIMO, multiple UEs may transmit simultaneously. Generally, if multiple UEs, e.g., two UEs, transmit simultaneously with each transmitting at the same transmit power level as when only one UE is transmitting, then the ICI would double. A prior art technique to reduce ICI in UL MU-MIMO would have the two UEs reduce their transmit power level by a factor, e.g., half, so that when both UEs transmit, a total ICI would be approximately the same as if only one UE was transmitting at a non-reduced transmit power level.

However, the ICI caused by transmissions from CEU may dominate the ICI caused by transmissions from CCU. Therefore, it may be possible to mask the ICI caused by transmissions from CCU by scheduling a CCU and a CEU to transmit simultaneously using UL MU-MIMO.

Figure 16A:
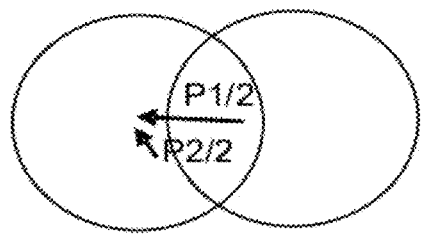
FIG. 16a is a diagram of a prior art technique for supporting UL MU-MIMO.

FIG. 16a illustrates a prior art technique for supporting UL MU-MIMO. As discussed previously, the prior art technique for supporting UL MU-MIMO includes reducing a transmit power level of the scheduled UEs so that their combined ICI is approximately equal to the ICI of a single UE. However, by reducing the transmit power level, MU-MIMO gain may be sacrificed.

Figure 16B:
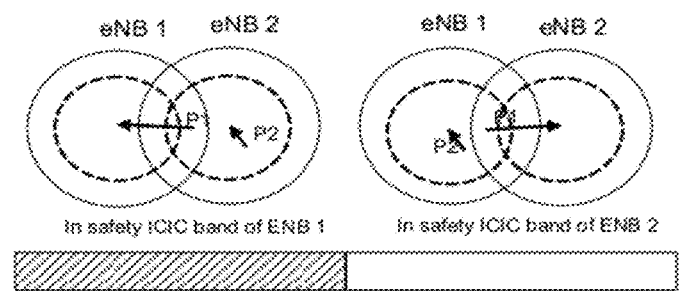
FIG. 16b is a diagram of a prior art technique for supporting UL MU-MIMO using ICIC.

FIG. 16b illustrates a prior art technique for supporting UL MU-MIMO using ICIC. The prior art technique for supporting UL MU-MIMO using ICIC includes dividing network resources into multiple, e.g., three, frequency bands and labeling one of the frequency bands a safety or anchor frequency band of an eNB. CEUs of the eNB with greater priority than CCUs may be scheduled in the safety frequency band. Additionally, neighboring eNBs should schedule their CCUs in the same frequency band as the eNB's safety frequency band.

Although the discussion focuses on three frequency bands and one safety frequency band, more than three frequency bands may be utilized. Similarly, two groups of UEs (CCU and CEU) are discussed; more than two groups of UEs may be used. Therefore, the discussion presented herein should not be construed as being limiting to either the spirit or the scope of the embodiments.

Figure 16C:
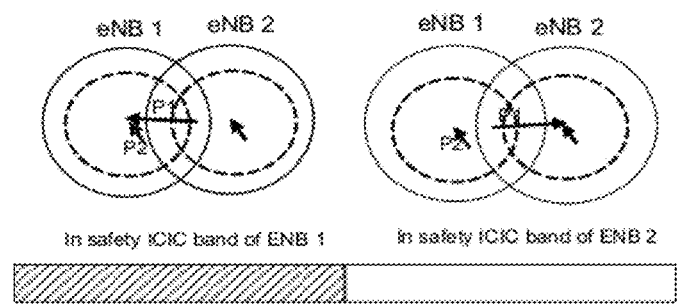
FIG. 16c is a diagram of a technique for supporting UL MU-MIMO with ICIC without transmit power reduction.

FIG. 16c illustrates a technique for supporting UL MU-MIMO with ICIC without transmit power reduction. The technique for supporting UL MU-MIMO with ICIC without transmit power reduction also includes dividing network resources into multiple, e.g., three, frequency bands and labeling one of the frequency bands a safety or anchor frequency band of an eNB. In the safety frequency band of the eNB, the eNB may perform UL MU-MIMO by paring a CEU with a CCU, thereby producing CEU/CCU MIMO, if possible. The CEU and the CCU pair may be scheduled to transmit with no reduction in transmit power level since the simultaneous transmissions by the CEU and the CCU pair is not expected to introduce additional interference since the transmissions from the CEU dominates the transmissions from the CCU interference wise.

In the other frequency bands of the eNB, the eNB may perform CEU/CCU MIMO if possible, but pairings of CEU or CCU only, not a mixing of CEU and CCU. In the other frequency bands of the eNB, any scheduled CEU or CCU pair may be made with the transmit power level reduced to avoid additional interference caused by UL MU-MIMO. In any of the frequency bands, the eNB may use a successive interference cancellation receiver to improve CEU performance.

Figure 17:
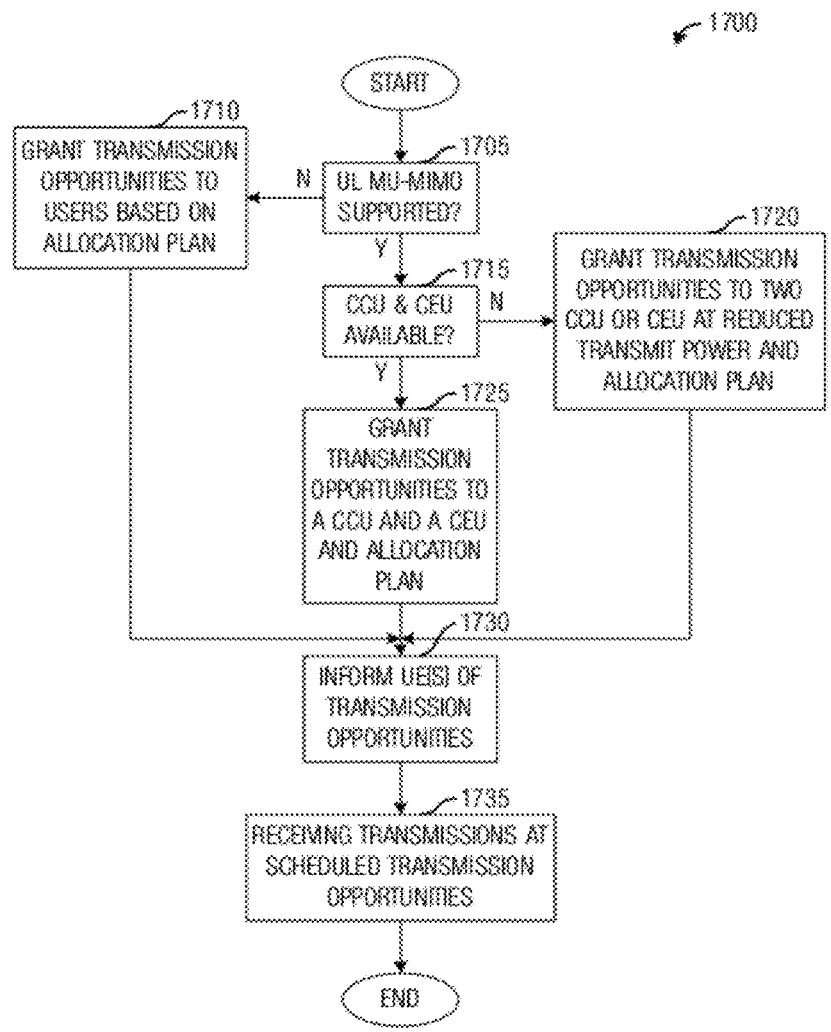
FIG. 17 is a flow diagram of eNB operations in scheduling transmission opportunities for UEs and receiving transmissions from the UEs with support for UL MU-MIMO.

FIG. 17 illustrates a flow diagram of eNB operations 1700 in scheduling transmission opportunities for UEs and receiving transmissions from the UEs with support for UL MU-MIMO. eNB operations 1700 may be indicative of operations occurring in an eNB as the eNB schedules transmission opportunities for UEs served by the eNB and receives transmissions from the UEs that are scheduled transmission opportunities, wherein the eNB supports UL MU-MIMO. The eNB also supports ICIC and will attempt to reduce ICI through network resource allocation and UE selection. eNB operations 1700 may continue while the eNB continues to serve UEs and wishes to allow the UEs to transmit.

eNB operations 1700 may begin with the eNB performing a check to determine if it is supporting UL MU-MIMO (block 1705). If the eNB is not supporting UL MU-MIMO, then the eNB may grant transmission opportunities to UEs that it is serving based on any of a variety of allocation plans, such as allocation plans supporting ICIC discussed herein (block 1710). In addition to following an allocation plan, the eNB may grant transmission opportunities based on factors such as UE priority, data priority, UE service history, communications system load, available bandwidth, data payload, data consumption rate and/or production rate, and so forth.

If the eNB supports UL MU-MIMO, then the eNB may perform a check to determine if there are both CCU and CEU available to transmit (block 1715). As discussed previously, ICI resulting from CEU transmissions may dominate ICI resulting from CCU transmission. Therefore, it may be possible to mask ICI resulting from CCU transmission with ICI resulting from CEU transmission by scheduling transmission opportunities to a CEU at the same time a CCU transmission opportunity is scheduled.

If there are not both CCU and CEU available to transmit, then the eNB may schedule two or more CCU or CEU to transmit simultaneously at reduced transmit power levels based on an allocation plan (block 1720). For example, the eNB may schedule two CCU or two CEU to transmit simultaneously at half of a normal transmit power level for one CCU or CEU.

If there are both CCU and CEU available, then the eNB may schedule one CCU and one CEU to transmit simultaneously at their normal transmit power levels based on an allocation plan, such as one presented in FIG. 16c (block 1725). According to an embodiment, the eNB may schedule an equal number of CCU and CEUs to transmit simultaneously.

After scheduling transmission opportunities (block 1710, block 1720, or block 1725), the eNB may inform the scheduled UEs of their transmission opportunities by transmitting information to the scheduled UEs (block 1730). The eNB may then receive transmissions from the scheduled UEs at the scheduled transmission opportunities (block 1735). eNB operations 1700 may then terminate.

Figure 18:
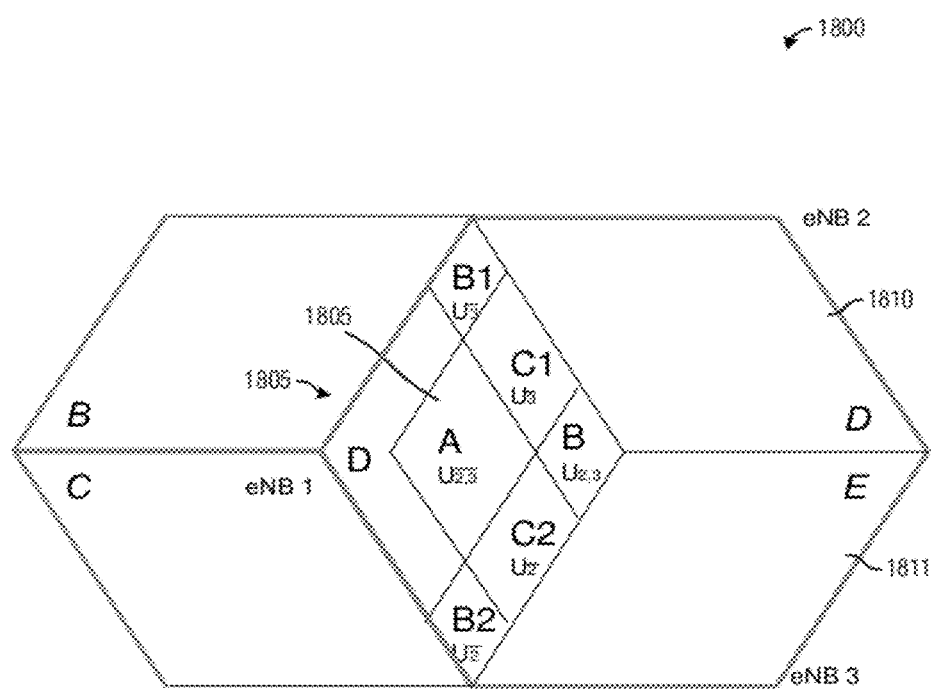
FIG. 18 is a sector diagram of a wireless access system highlighting UE classifications.

FIG. 18 illustrates a sector diagram of a wireless access system 1800 highlighting UE classifications. As shown in FIG. 18, a sector, such as sector A 1805 may have first tier neighbor sectors. For example, sector A 1805 may have two intra-eNB neighbor sectors B and C that are sectors of the same eNB and two inter-eNB neighbor sectors D 1810 of eNB 2 and E 1811 of eNB 3.

As discussed previously, based on a criterion of UE classification, a UE in sector A 1805 may be categorized into one of several groups: A first group (group A) is made up of UEs that are CCUs. A UE in group A is a CCU relative to four (4) neighboring sectors (sectors B, C, D, and E). A second group (group B) is made up of UEs that are CEUs relative to more than two sectors, for example, sectors D and E. A third group (group B1) and a fourth group (group B2) are similarly defined.

A fifth group (group C1) and a sixth group (group C2) is made up of UEs that are CEU relative to a neighboring eNB. For example, UEs in group C1 are CEU relative to sector D of eNB 2. A seventh group (group D) is made up of UEs that are CEU relative to the same eNB. For example, UEs in group D are CEU to the two sectors of eNB 1 (sectors B and C).

UE centric reuse may be supported using a neighbor cell list. According to an embodiment, a neighbor cell list may include entries for UE served by an eNB and may include information such as UE identity (UE ID), neighbor eNB(s), group classification for the neighbor eNB(s) (CCU or CEU, for example), and so forth. The neighbor cell list may be stored in the form of a table in a memory of the eNB with one neighbor cell list per sector. An exemplary neighbor cell list is shown below

| UE ID | Neighbor sector/cell A | Neighbor sector/cell B | Neighbor sector/cell C | Neighbor sector/cell D | Neighbor sector/cell E |
|---|---|---|---|---|---|
| XXX | CEU | CCU | CEU | CCU | ... |
| YYY | CCU | CEU | CCU | CCU | ... |
| ZZZ | CCU | CCU | CEU | CEU | ... |
| ... | ... | ... | ... | ... | ... |

The use of a neighbor cell list may allow for the use of a wide variety of scheduler, with UEs being prioritized based on scheduler specific rules, such as proportional fairness (PF), round robin (RB), and so forth. Resource allocation may follow a reuse rule, such as those described herein.

Usually, in a wireless access system, the system load may not be balanced across the entirety of the wireless access system. For example, one cell may serve a larger number of UEs than a neighboring cell. Also, a distribution of UE groups, such as CCU and CEU, may not be consistent for different cells. As an example, in current FFR, a distribution of CCU to CEU may be assumed to be approximately ⅓ of UEs in a cell are CEU while the remaining ⅔ of UEs are CCU. Therefore, in an unbalanced cell, if the number of CEU is greater than ⅓ of UEs, then collisions between CEU may not be avoidable, while if the number of CEU is less than ⅓ of UEs, then there may be room for improvement to avoid collisions between edge CCUs and CEUs of neighboring cells, where edge CCU are CCUs that are close to a boundary defining CCU and CEU.

A technique that dynamically adjusts the partitioning of the frequency bands may be able to perform independent of CEU/CCU distribution and make CEU transmissions collision-free, as well as make edge CCU and CEU transmissions from neighboring eNBs collision-free. However, coordination between eNBs may be expensive in terms of overhead and stability. A semi-static technique for dynamically adjusting the partitioning of the frequency bands without any coordination propagation or with limited coordination propagation may reduce costs.

The technique for dynamically adjusting the partitioning of the frequency bands may start with each sector being assigned ⅓ of a total available bandwidth as a safety frequency band and then, based on system load, the bandwidth assigned to a safety frequency band of a sector may be adjusted. Three cases may be considered:

1. The number of CEUs is roughly equal to ⅓ of a total number of UEs. Conventional FFR may be utilized to allocate resource with the sector's safety frequency band being used for CEU transmission.
2. The number of CEUs is larger than ⅓ of the total number of UEs. ⅔ of the total available bandwidth may be assigned for CEU transmission, therefore, CEU transmissions may be assigned to more than ⅓ of the total available bandwidth.
3. The number of CEUs is less than ⅓ of the total number of UEs. Multi-ring FFR may be used to allocate resources for CEU and CCU transmission.

Although the above discussion focuses on ⅓ of a total number of UEs as a threshold for selecting different resource allocation techniques, the threshold may be set at different levels. Furthermore, ⅓ and ⅔ of the total available bandwidth is discussed as being amounts allocated for CEU usage. However, the amounts may also vary. Therefore, the discussion should not be construed as being limiting to either the scope or the spirit of the embodiments.

Figure 19A:
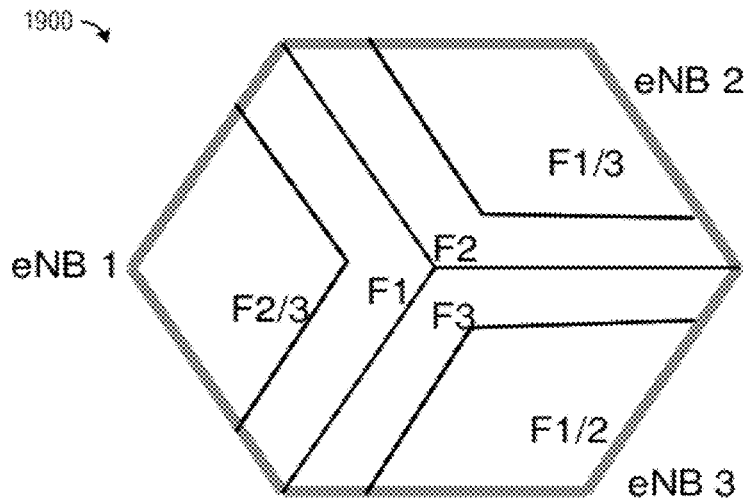
FIG. 19a is a sector diagram of a wireless access system, wherein neighboring sectors of neighboring eNBs are shown.

FIG. 19*a* illustrates a sector diagram of a wireless access system 1900, wherein neighboring sectors of neighboring eNBs are shown. The sector diagram of wireless access system 1900 may be illustrative of an exemplary frequency band allocation for the neighboring eNBs wherein the neighboring eNBs are each serving a number of CEUs that is roughly equal to ⅓ of a total number of UEs. Since the number of CEUs is roughly equal to ⅓ of the total number of UEs, conventional FFR may be used. As shown in FIG. 19*a*, CEU frequency band (i.e., the safety frequency band) may be reuse-3.

Figure 19B:
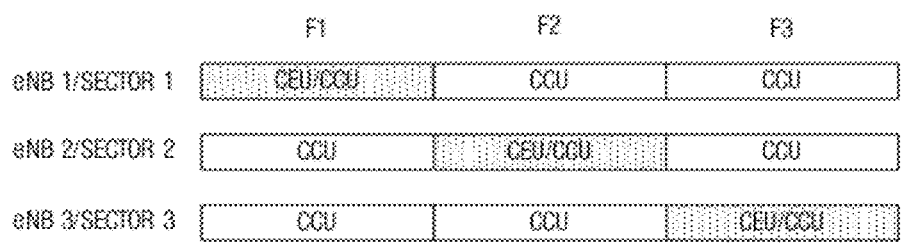

FIG. 19*b* illustrates a frequency band allocation for use with a sector diagram of wireless access system 1900 shown in FIG. 19*a*. As shown in FIG. 19*b*, each sector or eNB, for example, sector 1 or eNB 1, may be allocated ⅓ of the total bandwidth for a safety frequency band (for sector 1 or eNB 1, frequency band F1 is allocated as the safety frequency band) where CEUs/CCUs may be scheduled and ⅔ of the total bandwidth for a CCU frequency band (for sector 1 or eNB 1, frequency bands F2 and F3 are allocated as the CCU frequency band) where CCUs may be scheduled. The safety frequency bands for the different sectors shown in FIG. 19*b* are staggered so that no safety frequency band is shared by adjacent sectors.

Figure 20A:
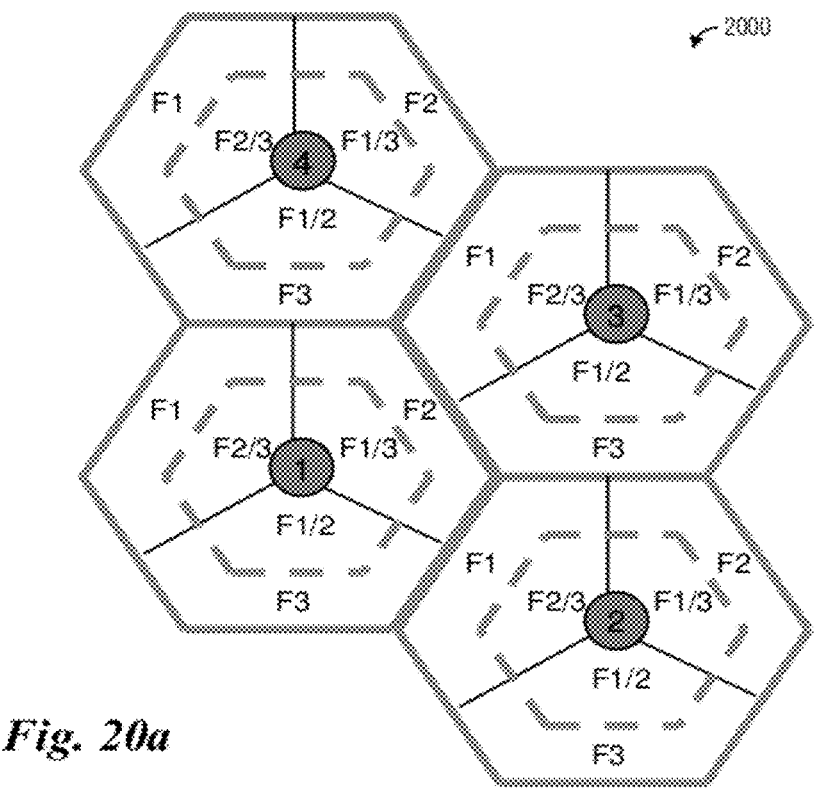
FIG. 20a is a sector diagram of a wireless access system, wherein sectors of a number of neighboring eNBs are shown.

FIG. 20*a* illustrates a sector diagram of a wireless access system 2000, wherein sectors of a number of neighboring eNBs are shown. The sector diagram of wireless access system 2000 may be illustrative of an exemplary frequency band allocation for the neighboring eNBs wherein the neighboring eNBs are each serving a number of CEUs that is roughly equal to ⅓ of a total number of UEs. Since the number of CEUs is roughly equal to ⅓ of the total number of UEs, conventional FFR may be used. As shown in FIG. 20*a*, CEU frequency band (i.e., the safety frequency band) may be reuse-3.

Figure 20B:
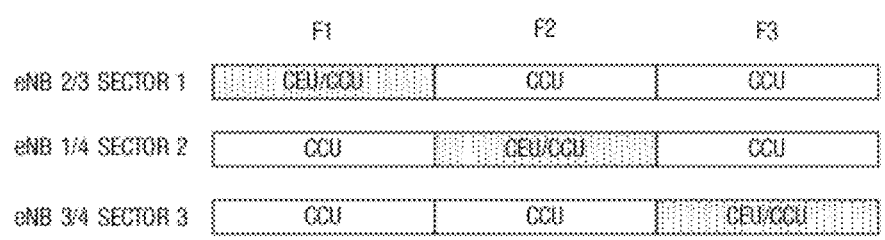

FIG. 20*b* illustrates a frequency band allocation for use with a sector diagram of wireless access system 2000 shown in FIG. 20*a*. As shown in FIG. 20*b*, each sector, for example, sector 1 of eNB 2 or eNB 3, may be allocated ⅓ of the total bandwidth for a safety frequency band (for sector 1 of eNB 2 or eNB 3, frequency band F1 is allocated as the safety frequency band) where CEUs/CCUs may be scheduled and ⅔ of the total bandwidth for a CCU frequency band (for sector 1 of eNB 2 or eNB 3, frequency bands F2 and F3 are allocated as the CCU frequency band) where CCUs may be scheduled. The safety frequency bands for the different sectors shown in FIG. 20*b* are staggered so that no safety frequency band is shared by adjacent sectors.

When the number of CEUs exceeds ⅓ of the total number of UEs, a ⅔ CEU frequency band usage technique may be used. The ⅔ CEU frequency band usage technique may be coordination free or very limited coordination may be applied. In the ⅔ CEU frequency band usage technique, CCUs may be scheduled to any CEU frequency band.

Figure 21A:
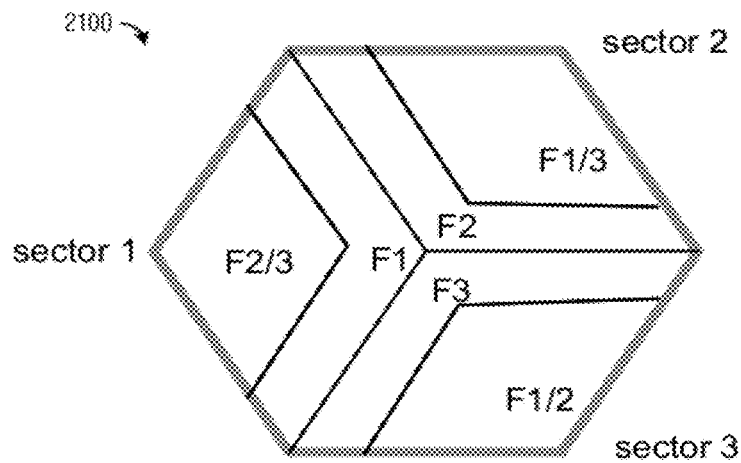
FIG. 21a is a sector diagram of a wireless access system, wherein neighboring sectors of neighboring eNBs are shown and ⅔ CEU frequency band usage technique is used.

FIG. 21a illustrates a sector diagram of a wireless access system 2100, wherein neighboring sectors of neighboring eNBs are shown and ⅔ CEU frequency band usage technique is used. The sector diagram shown in FIG. 21a illustrate a six-division scheme to enable the ⅔ CEU frequency band usage technique. As shown in FIG. 21a, CCUs may be typically allocated to ⅔ of the total available bandwidth plus CCUs may also be allocated to the remaining ⅓ of the total available bandwidth normally reserved for CEUs.

Figure 21B:
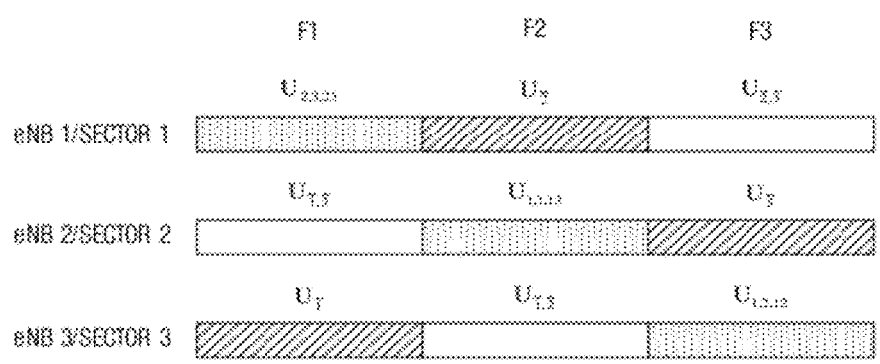

FIG. 21b illustrates a frequency band allocation for use with a sector diagram of wireless access system 2100 shown in FIG. 21a. The frequency band allocation shown in FIG. 21b illustrates one possible allocation of CEU and CCU to three frequency bands. With a particular frequency band, priority may or may not be given to certain groups of UEs. If priority is given to a certain group of UEs, one of two different notations may be used: a first notation $U_{i,j,ij}$ for a particular frequency band may indicate that for the particular frequency band, a scheduler should give higher scheduling priority to UEs that do create the most interference to sector i, or sector j, or sector i and sector j; a second notation $U_{\bar{i}}$ for a particular frequency band may indicate that for the particular frequency band, the scheduler should give higher scheduling priority to any UE except for the UE that creates the most interference to sector i. If a frequency band should not give a special scheduling priority to certain UE, then it may be left blank.

As an example, for sector 1 or eNB 1, a first frequency band F1 may be denoted $U_{2,3,23}$ meaning that the scheduler should allocate UEs that create the most interference to sector 2, or sector 3, or sector 2 and sector 3 at a higher priority; a second frequency band F2 may be denoted $U_{\bar{2}}$ meaning that the scheduler should allocate UEs except the UEs that create the most interference to sector 2 at a higher priority; and a third frequency band F3 may be denoted $U_{\bar{2},\bar{3}}$ meaning that the scheduler should allocate all UEs except the UEs that create the most interference to sector 2 or sector 3 at a higher priority. However, any UE may be scheduled in any frequency band.

Figure 22A:
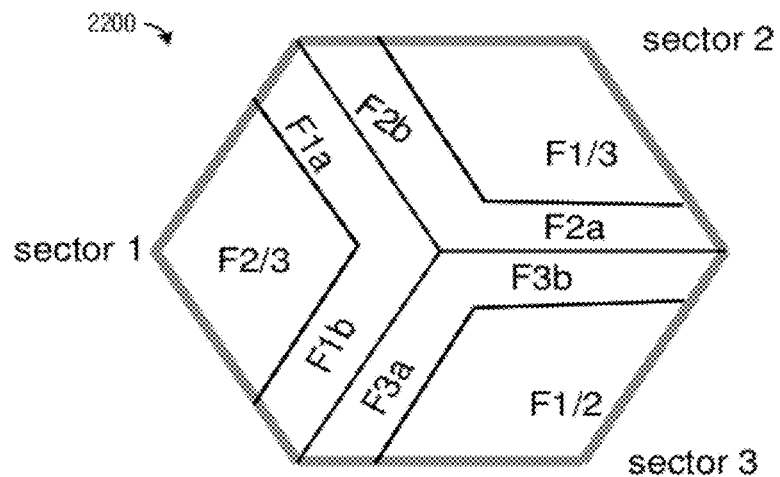
FIG. 22a is a sector diagram of a wireless access system, wherein sectors of a number of neighboring eNBs are shown and ⅔ CEU frequency band usage technique is used.

FIG. 22a illustrates a sector diagram of a wireless access system 2200, wherein sectors of a number of neighboring eNBs are shown and ⅔ CEU frequency band usage technique is used. The sector diagram shown in FIG. 22a differs from the sector diagram shown in FIG. 21a in that each of the frequency bands for allocation to CEU, i.e., the safety frequency bands, may have been partitioned into two subbands. As an example, the first frequency band F1, which as shown in FIG. 21a for sector 1 of eNB 1, may be allocated to UEs that create the most interference to sector 2 or sector 3 or sector 2 and sector 3 at a higher priority has been partitioned into subbands F1a and F1b, with both subbands still being allocated to UEs that create the most interference to sector 2 or sector 3 or sector 2 and sector 3 at a higher priority. Similarly, the second frequency band F2 and the third frequency band F3 may be partitioned into subbands that may be allocated to CCU or CEU instead of just CEU.

Figure 22B:
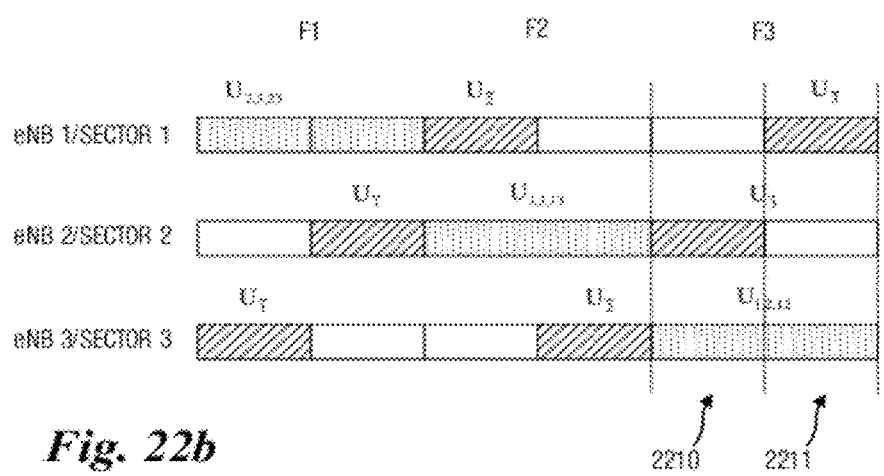

FIG. 22b illustrates a frequency band allocation for use with a sector diagram of wireless access system 2200 shown in FIG. 22a. The frequency band allocation shown in FIG. 22b illustrates one possible allocation of CEU and CCU to three frequency bands with the frequency bands being partitioned into multiple subbands to meet load imbalance in wireless access system 2200.

As an example, the third frequency band F3 which was formerly for sector 1 or eNB 1 was allocated to UEs that do not create the most interference to sector 2 or sector 3, for sector 2 or eNB 2 was allocated to UEs that do not create the most interference to sector 3, and for sector 3 or eNB 3 was allocated to UEs that do create the most interference to sector 1 or sector 2 or sector 1 and sector 2 (see FIG. 21b) may be partitioned into two subbands (F3a 2210 and F3b 2211). For sector 1 or eNB 1, subband F3a 2210 may be allocated to any UE and subband F3b 2211 may be allocated to any UE except the UEs that create the most interference to sector 3, for sector 2 or eNB 2, subband F3a 2210 may be allocated to any UE except the UEs that create the most interference to sector 3 and subband F3b 2211 may be allocated to any UE, and for sector 3 or eNB 3, both subband F3a 2210 and subband F3b 2211 may be allocated to any UE that creates the most interference to sector 1 or sector 2 or sector 1 and sector 2 at a higher priority.

When the number of CEUs is less than ⅓ of the total number of UEs, a multi-ring and multi-reuse technique may be used. With the number of CEUs being less than ⅓ of the total number of UEs, it may not be necessary to allocate an entire ⅓ of the available bandwidth to CEU allocation.

Figure 23A:
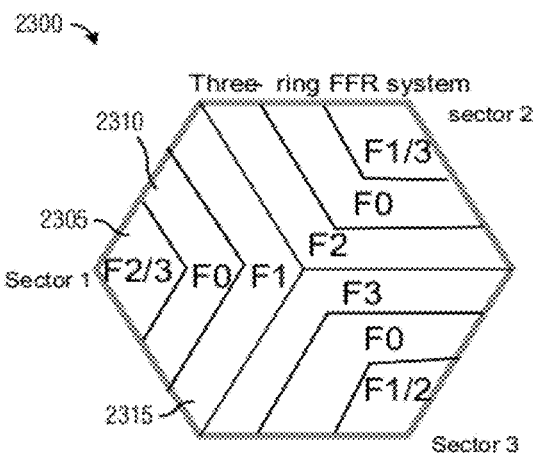
FIG. 23a is a sector diagram of a wireless access system, wherein neighboring sectors of neighboring eNBs are shown and a multi-ring frequency band usage technique is used.

FIG. 23a illustrates a sector diagram of a wireless access system 2300, wherein neighboring sectors of neighboring eNBs are shown and a multi-ring frequency band usage technique is used. As shown in FIG. 23a, sectors of wireless access system 2300 may be partitioned into three rings; with CEUs allocated to a single frequency band that is less than ⅓ of the total available bandwidth, and two rings, one of which may make use of two frequency bands dedicated to CCU allocation. Since CCU closest to the cell center (for example, region 2305) may have the highest performance, the greatest bandwidth may be allocated to them, while CCU further away from the cell center but not yet CEU (for example, region 2310) may account for a small number of CCU, a small amount of bandwidth may be allocated to them. A remainder of the available bandwidth may be allocated to CEU (shown as region 2315).

Figure 23B:
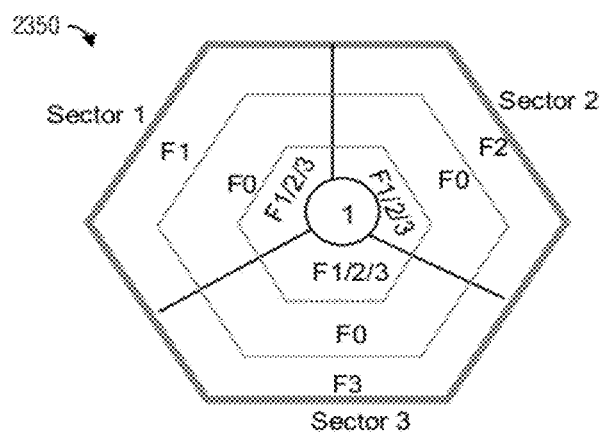
FIG. 23b is a sector diagram of a wireless access system, wherein neighboring sectors of a single eNB are shown and a multi-reuse frequency band usage technique is used.

FIG. 23b illustrates a sector diagram of a wireless access system 2350, wherein neighboring sectors of a single eNB are shown and a multi-reuse frequency band usage technique is used. As shown in FIG. 23b, sectors of wireless access system 2350 may be partitioned into three regions with different reuse patterns. As an example, CCU closest to the cell center of sector 1 may make use of any of three frequency bands (out of a total of four frequency bands), while CCU further away from the cell center may use one frequency band different from the three usable by the CCU closest to the cell center and CEU may also make use of one frequency band that is usable by the CCU closest to the cell center. Since the depending on definition, the CCU further away from the cell center may have the smallest number of UEs, the frequency band for use by these UEs may be the smallest.

Figure 23C:
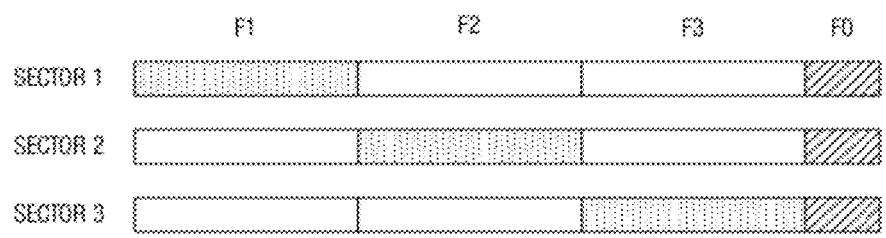
FIG. 23c is a diagram of a frequency band allocation for use with sector diagrams of wireless access systems shown in FIGS. 23a and 23b.

FIG. 23c illustrates a frequency band allocation for use with sector diagrams of wireless access systems 2300 and 2350 shown in FIGS. 23a and 23b. As shown in FIG. 23c, the total available bandwidth may be partitioned into four frequency bands, with frequency bands potentially being unequal in size. As discussed previously, it may be possible to define CCU further away from the cell center so that they make up a small number of UEs, therefore a smallest frequency band may be allocated to their use, i.e., frequency band F0. The remaining three frequency bands F1, F2, and F3 may then be shared by the CCU closest to the cell center and the CEU.

Figure 24:
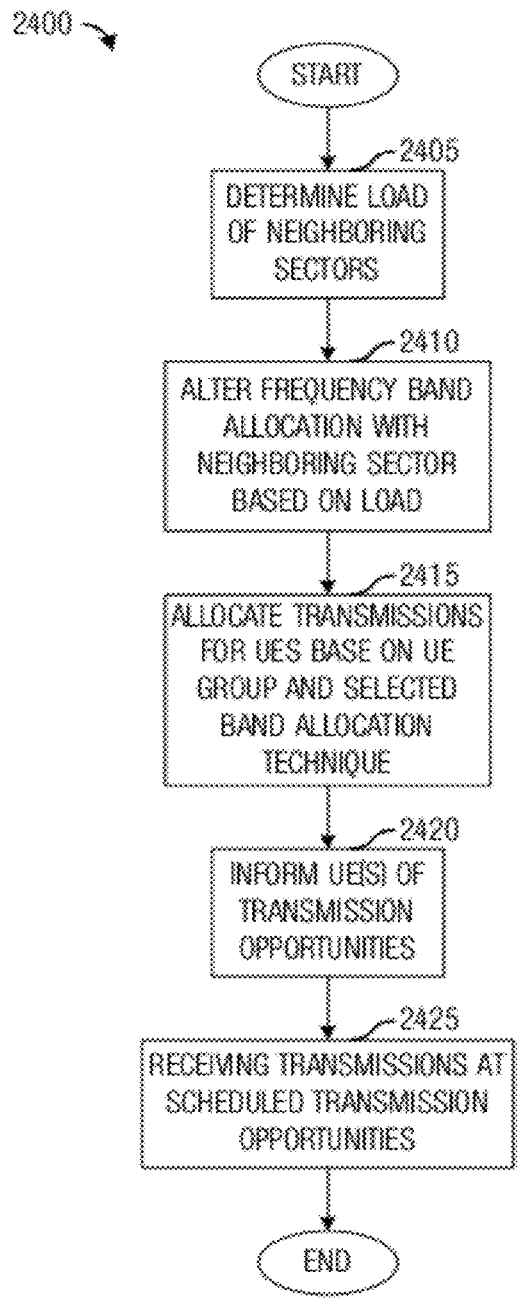
FIG. 24 is a flow diagram of eNB operations in adapting frequency band allocation to compensate for load imbalance in a wireless access system, allocating transmission opportunities to UEs, and receiving transmissions.

FIG. 24 illustrates a flow diagram of eNB operations 2400 in adapting frequency band allocation to compensate for load imbalance in a wireless access system, allocating transmission opportunities to UEs, and receiving transmissions. eNB operations 2400 may be indicative of operations occurring in an eNB as the eNB attempts to adapt frequency band allocations to meet load imbalances in neighboring sectors, allocate transmission opportunities, and receive transmissions over the allocated transmission opportunities.

eNB operations 2400 may begin with the eNB determining load conditions of sectors of the eNB as well as any adjacent sectors (block 2405). According to an embodiment, load conditions of the sectors comprising a coverage area of the eNB may be known by the eNB since the eNB is serving UEs operating in the sectors. Load conditions of sectors of neighboring eNBs that are adjacent to the sectors of the eNB may be determined by either sharing load information with the neighboring eNBs or detecting and keeping track of transmissions occurring in the adjacent sectors.

Based on the load conditions, the eNB may alter frequency band allocations of sectors that are overloaded or under loaded with frequency band allocations of adjacent sectors (block 2410). For example, if CEU in a first sector of the eNB are overloaded and CCU in a second sector that is adjacent to the first sector are underloaded, then the eNB may increase the size of frequency bands allocated for CEU in the first sector while decreasing the size of frequency bands allocated for CCU in the second sector if the second sector is controlled by the eNB or requesting that the size of frequency bands allocated for CCU in the second sector be reduced if a neighboring eNB controls the second sector.

According to an embodiment, care should be given to which particular frequency band to increase or decrease as well as scheduling priority in order to not significantly increase interference cause to neighboring sectors. For example, if a frequency band selected to increase available bandwidth for a first sector is also a part of a safety band of a second sector, then the scheduler should give higher priority to UEs that do not create the most interference to the second sector.

According to an embodiment, rather than altering the size of a frequency band, the eNB may swap an allocation of a frequency band from a first UE group, such as CEU or CCU, to a second UE group, such as CCU or CEU.

According to an embodiment, to simplify management of the frequency bands, frequency bands may be increased or decreased in specified amounts. By changing the frequency band size in specified amounts, signaling may be simplified since it may not be necessary to specify how much to alter the size of the frequency bands.

After the frequency bands have been altered, the eNB may allocate transmissions to UE based on UE groupings and a selected frequency band allocation technique, such as those discussed herein (block 2415). The eNB may then inform UEs that have been allocated transmissions information regarding their allocations (block 2420). Subsequently, the eNB may receive transmissions from the UEs over the allocated transmissions (block 2425) and eNB operations 2400 may then terminate.

According to an embodiment, eNB operations 2400 may swap frequency band allocations between adjacent sectors to meet load imbalances so that it may not be necessarily to propagate load information throughout the wireless access system. By eliminating the need to propagate load information, eNB operations 2400 may be stable. Furthermore, since only adjacent sectors are considered, coordination between eNBs may be really simple. Additionally, eNB operations 2400 may be a localized process since coordination is simple and information propagation is not needed.

According to an embodiment, determining of loads and if needed, altering of the frequency band allocations, may occur at specified intervals or upon an occurrence of an event, such as an increased latency or wait time for certain UE groups due to increased contention for an inadequate number of resources. Other examples of events may be failure to meet a quality of service restriction, a minimum data rate, increased buffer overruns, or so on.

Figure 25A:
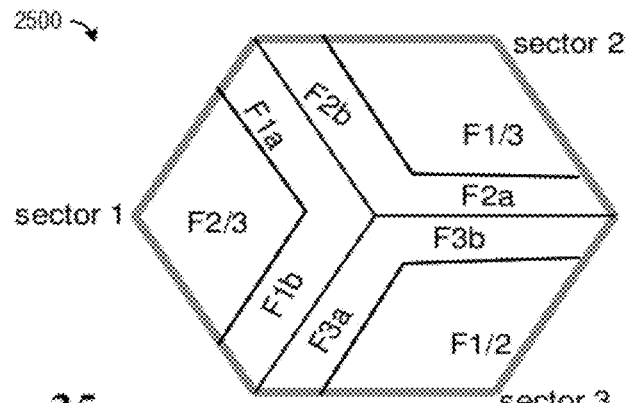
FIG. 25a is a sector diagram of a wireless access system for use in with an adaptive load imbalance compensation technique.

FIG. 25a illustrates a sector diagram of a wireless access system 2500 for use in with an adaptive load imbalance compensation technique. As shown in FIG. 25a, wireless access system 2500 may use a six division technique to enable coordination-free adaptation to load imbalance. The sector diagram illustrates that the available bandwidth may be divided into three frequency bands, with CCU in a single sector may utilize reuse-2, while a single frequency band allocated for CEU may be divided into two subbands and may utilize reuse-3.

The six division technique shown in FIG. 25a is applied to a wireless access system with a regular layout, such as one wherein cells are divided into three sectors each. If a wireless access system utilizes an irregular layout, then a number of inter-eNB adjacent sectors will be less than six. Therefore, the six division technique may be used on a wireless access system independent of layout (regular or irregular).

Figure 25B:
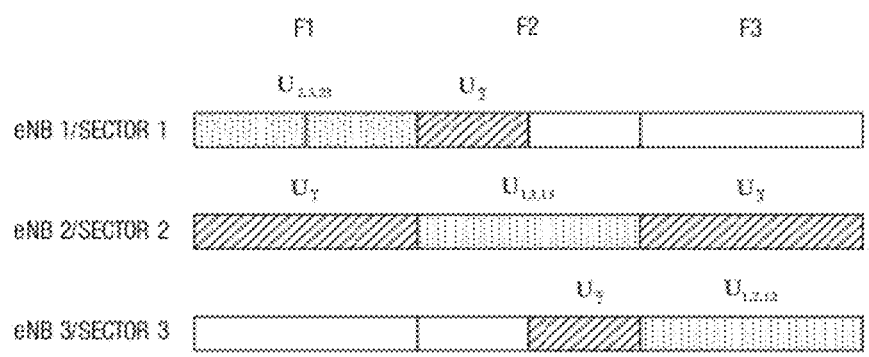
FIG. 25b is a diagram of a first frequency band allocation for use with a sector diagram of wireless access system shown in FIG. 25a, where a load on sector 2 of an eNB is greater than loads on sector 1 and sector 3.

FIG. 25b illustrates a first frequency band allocation for use with a sector diagram of wireless access system 2500 shown in FIG. 25a, where a load on sector 2 of an eNB is greater than loads on sector 1 and sector 3. Since the load on sector 2 is greater than the loads on sector 1 and sector 3, an entirety of the frequency band may be allocated to CEU of sector 2, while only one-half of the frequency band may be allocated to CEU of sector 1 or sector 3.

Frequency bands that have been removed from use by sector 1 or eNB 1 (e.g., frequency subband F2b and frequency band F3) and sector 3 or eNB 3 (e.g., frequency band F1 and frequency subband F2a) may be reassigned for use by sector 2 or eNB 2. However, since frequency subband F2a remains in use by sector 1 or eNB 1, the scheduler should schedule UEs that do not create the most interference to sector 2 at a higher priority. Similarly, frequency subband F2b remains in use by sector 3 or eNB 3, the scheduler should schedule UEs that do not create the most interference to sector 2 at a higher priority.

Figure 25C:
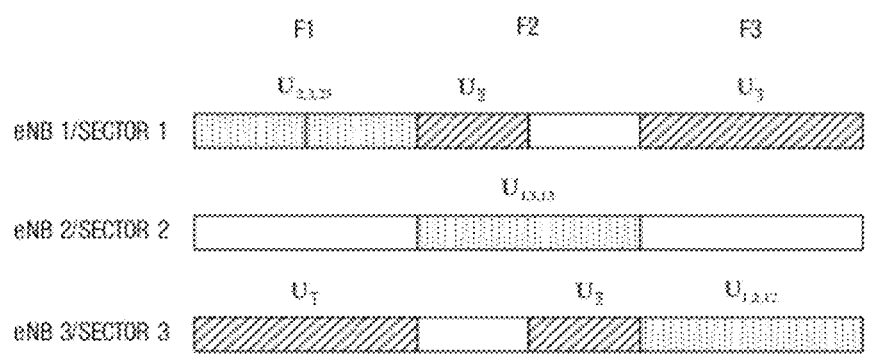
FIG. 25c is a diagram of a second frequency band allocation for use with a sector diagram of wireless access system shown in FIG. 25a, where a load on sector 2 of an eNB is less than loads on sector 1 and sector 3.

FIG. 25c illustrates a second frequency band allocation for use with a sector diagram of wireless access system 2500 shown in FIG. 25a, where a load on sector 2 of an eNB is less than loads on sector 1 and sector 3. Since the load on sector 2 is less than the loads on sector 1 and sector 3, only one-third of the frequency band may be allocated to CEU of sector 2, while only five-sixth of the frequency band may be allocated to CEU of sector 1 or sector 3. Unshaded portions of the first frequency band allocation are unused for allocation to CEU.

Figures 26A, 26B:
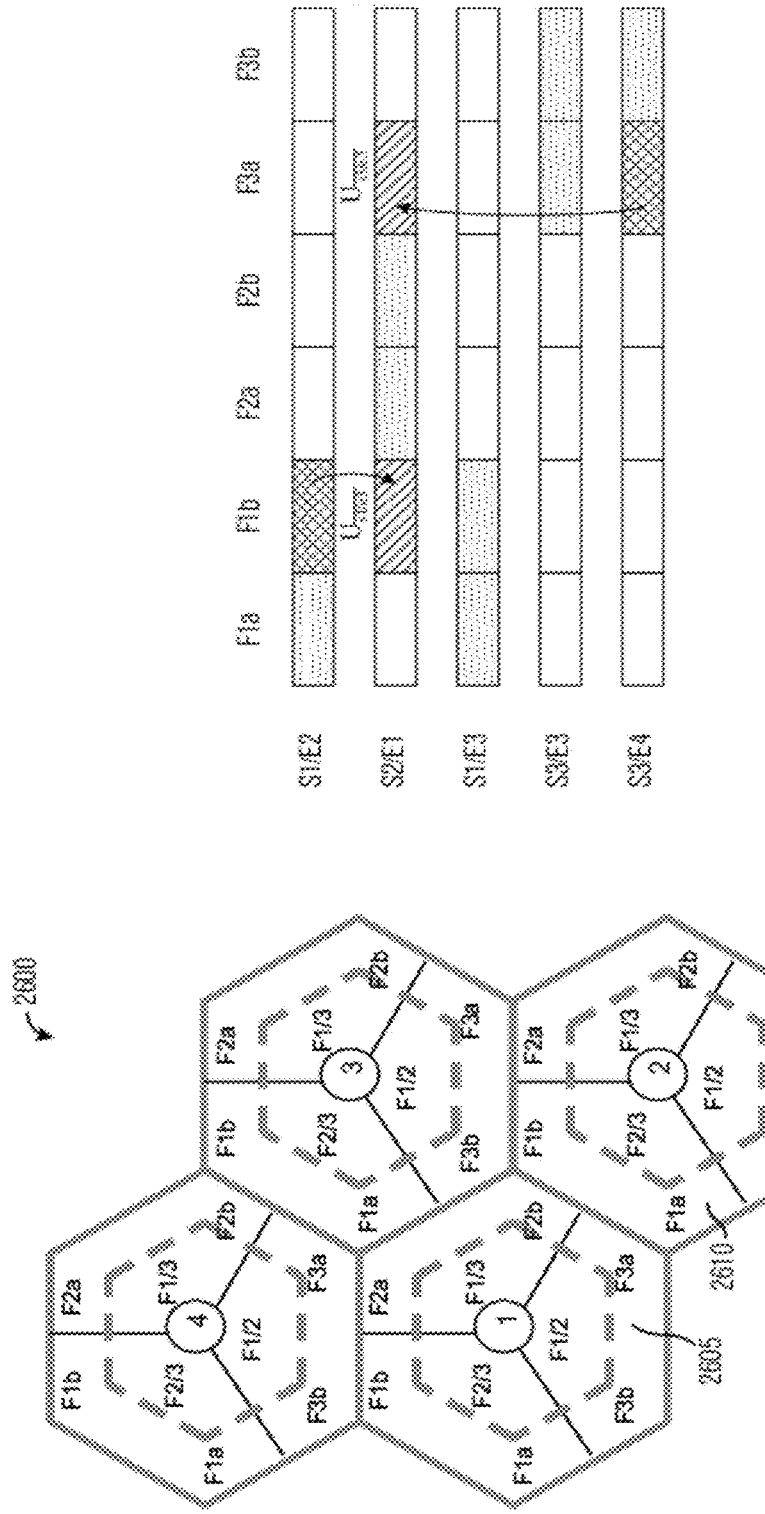
FIG. 26a is a sector diagram of a four eNB portion of a wireless access system for use with an adaptive load imbalance compensation technique.
FIG. 26*b* is a diagram of a frequency band allocation for use in a sector diagram of wireless access system shown in FIG. 26*a*.

FIG. 26a illustrates a sector diagram of a four eNB portion of a wireless access system 2600 for use with an adaptive load imbalance compensation technique. The sector diagram shown in FIG. 26a illustrates a larger portion of wireless access system 2600 in order to show the operation of the adaptive load imbalance compensation technique over multiple eNBs. Since the adaptive load imbalance compensation technique operates on adjacent cells, it may be possible to change frequency band allocations between cells controlled by different eNBs. As an example, cell 3 of eNB 1 (shown as region 2605) may be adjacent to cell 1 of eNB 2 (shown as region 2610).

When changes in frequency band allocations occur between cells controlled by different eNBs, messages may need to be exchanged between the eNBs involved. According to an embodiment, X2 messages may be exchanged between the eNBs involved to handle the changes in frequency band allocations.

FIG. 26b illustrates a frequency band allocation for use in a sector diagram of wireless access system 2600 shown in FIG. 26a. As shown in FIG. 26b, subband F1b, formerly part of a safety frequency band of sector 1 of eNB 2, has been reallocated to sector 2 of eNB 1 where the scheduler will schedule UEs except UEs that create the most interference to sector 1 of eNB 3 at a higher priority. Additionally, subband F3a, formerly part of a safety frequency band of sector 3 of eNB 4, has been reallocated to sector 2 of eNB 1 where the scheduler will schedule UEs except UEs that create the most interference to sector 3 of eNB 3.

Figure 27:
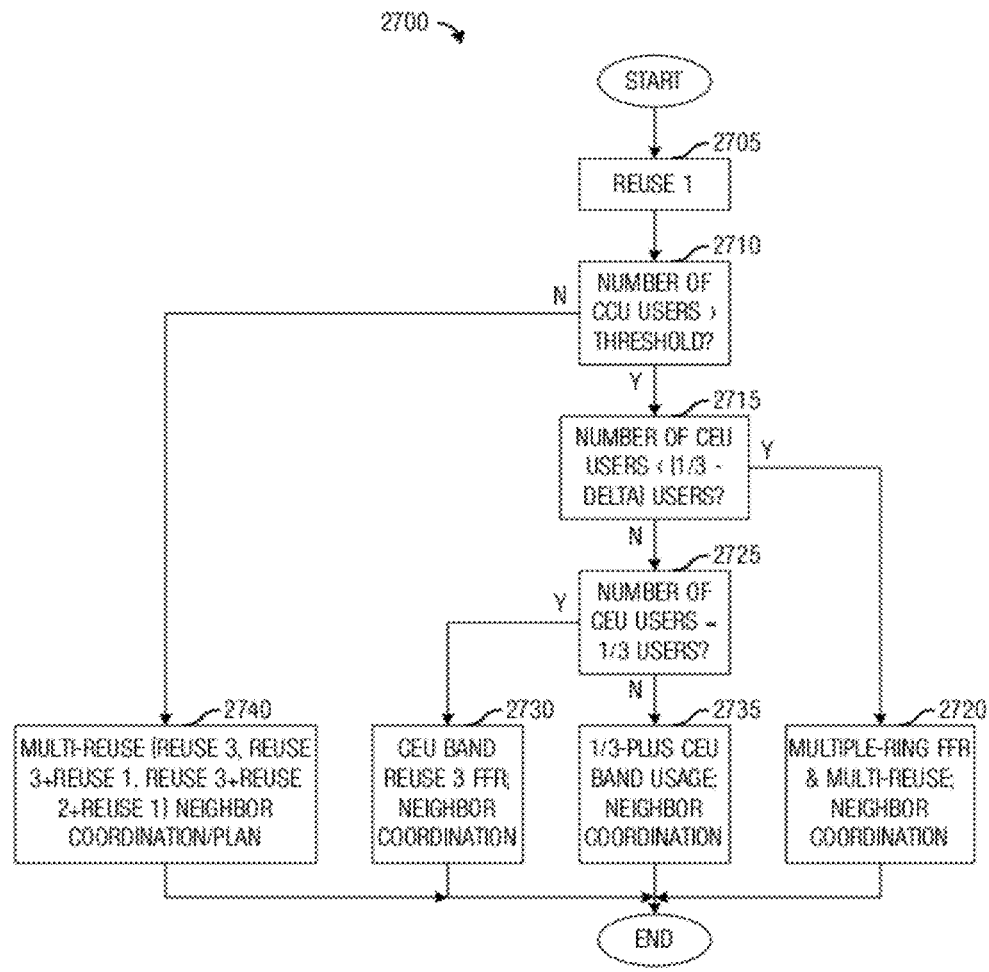
FIG. 27 is a flow diagram of eNB operations in ICIC deployment.

FIG. 27 illustrates a flow diagram of eNB operations 2700 in ICIC deployment. eNB operations 2700 may be indicative of operations occurring in an eNB employing ICIC, wherein the eNB may be serving a UE distribution differing from a standard distribution but wishes to maintain good performance.

eNB operations 2700 may begin with the eNB starting off with a reuse-1 as its ICIC plan (block 2705). By starting with a reuse-1 ICIC plan, an adequate level of performance may be provided while the eNB determines a distribution of its UEs.

After determining a distribution of its UEs, e.g., a number of CCU, a number of CEU, a total number of UEs, and so forth, the eNB may perform a check to determine if the number of CCU exceeds a threshold (block 2710). The check performed in block 2710 may be used to determine if there are any CCU served by the eNB or if the number of CCU served by the eNB exceeds a minimum number that may be required for ICIC operation.

If the number of CCU exceeds the threshold, then the eNB may perform another check to determine if there are less than a first specified number of CEU (block 2715). Generally, the first specified number of CEU may be about ⅓ of a total number of UEs plus or minus a delta to provide an error margin. If there is less than the first specified number of CEU, then the eNB may employ a multiple-ring FFR and multi-reuse ICIC technique with neighbor sector coordination to adapt to load imbalances (block 2720).

If the number of CEU is not less than the first specified number, then the eNB may check to determine if the number of CEU is equal to a second specified number of CEU (block 2725). Typically, the second specified number of CEU may be equal to about ⅓ of the total number of UEs. If the number of CEU is equal to the second specified number of CEU, then the eNB may employ a reuse-3 FFR technique for a frequency band allocated to CEUs with neighbor sector coordination to adapt to load imbalances (block 2730).

If the number of CEU is equal to the second specified number of CEU, then the eNB may employ a ⅓ plus CEU frequency band ICIC technique with neighbor sector coordination to adapt to load imbalances (block 2735). If the number of CCU users is not greater than the threshold (block 2710), then the eNB may employ a multi-reuse FFR plan, such as a reuse-3, reuse-3+reuse-1, and reuse-3+reuse-2+ reuse-1 plan, along with neighbor sector coordination to adapt to load imbalances (block 2740). With an ICIC plan selected, the eNB may allocate transmissions to UEs and adapt to detected load imbalances and eNB operations 2700 may then terminate.

Advantageous features of embodiments of the invention may include: A method for providing uplink inter cell interference coordination in a wireless access system, the method comprising: categorizing users the wireless access system; selecting a resource allocation plan based on the categorized users; allocating resources to the users in the wireless access system based on the selected resource allocation plan; and receiving transmissions from the users. The method could further include, wherein selecting resource allocation plan comprises: selecting a reuse-3 resource allocation plan in response to determining that there are no center cell users in the wireless access system; selecting a multiple-ring fractional frequency reuse (FFR) resource allocation plan in response to determining that the wireless access system can support more than a two-ring FFR resource allocation; selecting a multiple reuse resource allocation plan in response to determining that the wireless access system cannot support a two-ring FFR resource allocation; and selecting a two-ring FFR resource allocation plan in response to determining that the wireless access system cannot support only a two-ring FFR resource allocation. The method could further include, wherein the wireless access system comprises a plurality of controllers, the method further comprising, coordinating resource allocations with neighboring controllers. The method could further include, wherein the multiple reuse resource allocation plan comprises a reuse-1 allocation of a frequency band, a reuse-2 allocation of the frequency band, and a reuse-3 allocation of the frequency band. The method could further include, wherein the reuse-1 allocation, the reuse-2 allocation, and the reuse-3 allocation occurs in sequence. The method could further include, wherein the multiple reuse resource allocation plan comprises a reuse-1 allocation of the frequency band and a reuse-3 allocation of the frequency band. The method could further include, wherein the reuse-1 allocation and the reuse-3 allocation occurs sequentially. The method could further include, wherein determining that there are no center cell users comprises evaluating:

$$\delta = \frac{\gamma}{\sqrt{1+2\gamma}-1} - 1,$$

where $\gamma$ is a measured signal to noise ratio and $\delta$ is interference over thermal noise. The method could further include, wherein determining that the wireless access system can support more than a two-ring FFR comprises: computing a signal-to-noise ratio distribution based on reported downlink pilots and measured uplink pilots; dividing the users into N groups, where N is an integer value greater than two (2), in response to determining that a range of the signal-to-noise ratio distribution is greater than a threshold; and determining that the wireless access system can support N-ring FFR if $\eta_{1 \to 2} \eta_{2 \to 1} < 1 + \gamma_0$ is satisfied, where $\eta_{i \to j}$ is an interference over thermal noise caused by user i to user j. The method could further include, further comprising, initially selecting a reuse-1 resource allocation plan. The method could further include, wherein the wireless access system comprises a plurality of controllers, wherein categorizing users comprises grouping users based on a distance between each controller in the plurality of controllers and users served by the controller. The method could further include, wherein categorizing users further comprises grouping users based on a distance between each user and controllers other than the user's serving controller. The method could further include, wherein categorizing users comprises at each controller, receiving a signal strength measurement from each user served by the controller; measuring a signal strength of each user signal; estimating an interference measure to each neighboring controller for each user based on the received signal strength measurement and the measured signal strength; and grouping each user based on the estimated interference measure. The method could further include, wherein categorizing users comprises at each controller, requesting neighboring controllers measure interference due to a transmission of a user; receiving the measured interference from the neighboring controllers; and grouping the user based on the measured interference. The method could further include, further comprising, combining the measured interference from the neighboring controllers. The method could further include, wherein categorizing users in the wireless access system is based on a throughput of users in the wireless access system. The method could further include, wherein the wireless access system comprises a plurality of controllers, wherein each controller servers a potentially different number of users, wherein the categorization of users in the wireless access system is based on a combined throughput of users being served by neighboring controllers. The method could further include, wherein the categorization of users in the wireless access system comprises: comparing a combined throughput of users being served by neighboring controllers with a throughput of individual users; and categorizing the users based on the comparison. The method could further include, wherein the categorizing users in the wireless access system is further based on a capacity of users in the wireless access system.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for scheduling time-frequency resources for a base station that supports multi-user multiple-input-multiple-output (MU-MIMO) uplink communication, the method comprising:
   pairing a first cell edge user (CEU) and a first cell center user (CCU) to be served by the base station; and
   assigning a first one of the time-frequency resources to both of the first CEU and the first CCU, thereby scheduling the first time-frequency resource for MU-MIMO transmission,
   wherein the first time-frequency resource is associated with one or more normal power levels assigned for single user transmission, and
   wherein the one or more normal power levels of the first time-frequency resource remain unadjusted after the assigning step.

2. The method of claim 1, wherein the first time-frequency resource exists in a frequency band associated with CEU uplink transmission in the cell.

3. The method of claim 1, wherein the one or more normal power levels of the first time-frequency resource are not adjusted as a result of the first time-frequency resource being scheduled for MU-MIMO transmission.

4. The method of claim 1, wherein the one or more normal power levels comprise a first normal power level computed for single-user CEU transmissions and a second normal power level computed for single-user CCU transmissions, and wherein the first normal power level and the second normal power level remain unadjusted after the assigning step.

5. The method of claim 4, wherein neither the first normal power level nor the second normal power level are adjusted as a result of the first time-frequency resource being scheduled for MU-MIMO transmission.

6. The method of claim 4, wherein the first normal power level is projected to cause a threshold level of inter-cell-interference to be observed by one or more neighboring base stations when used to perform a single-CEU uplink transmission in the first time-frequency resource.

7. The method of claim 6 further comprising:
   receiving a first uplink transmission and a second uplink transmission via the first time-frequency resource, wherein the first uplink transmission is transmitted by the first CEU at the first normal power level and the second uplink transmission is transmitted by the first CCU at the second normal power level, and
   wherein an effective amount of inter-cell-interference observed by the one or more neighboring base stations does not substantially exceed the threshold level of inter-cell-interference that was projected to be caused by the single-CEU uplink transmission performed at the first normal power level.

8. The method of claim 7, wherein the effective amount of inter-cell-interference observed by a neighboring base station is dominated by inter-cell-interference attributable to the first uplink transmission such that inter-cell-interference attributable to the second uplink transmission is masked by the inter-cell-interference attributable to the first uplink transmission.

9. An apparatus for scheduling time-frequency resources of a base station supporting multi-user multiple-input-multiple-output (MU-MIMO) uplink communication, the apparatus comprising:
   a processor; and
   a computer readable storage medium storing programming for execution by the processor, the programming including instructions to:
      pair two users to be served by the base station;
      schedule a MU-MIMO uplink transmission by allocating a common time-frequency resource to the two users, the common time-frequency resource being associated with a set of normal power levels for single-user uplink transmissions;
      adjust the normal power settings when the common time-frequency resource is allocated to a pair of cell-edge-users (CEUs); and
      maintain the normal power settings when the common time-frequency resource is allocated to a first CEU and a first cell-center-user (CCU).

10. The apparatus of claim 9, wherein the first time-frequency resource corresponds with a frequency band designated for CEU uplink transmission.

11. The apparatus of claim 9, wherein the normal power settings include a first normal power level for single-CEU transmissions, the first normal power level projected to produce a threshold level of inter-cell-interference in a neighboring cell when used to perform a single-CEU uplink transmission in the common time-frequency resource.

12. The apparatus of claim 11, wherein the instructions to adjust the normal power settings when the common time-frequency resource is allocated to a pair of CEUs include instructions to:
communicate a reduced first power level to the pair of CEUs, thereby triggering the pair of CEUs to perform their respective uplink transmissions at the reduced power level.

13. The apparatus of claim 12, wherein the reduced power level is equal to the first normal power level reduced by three decibels (3 dBs).

14. The apparatus of claim 12, wherein the reduced power level is projected to produce a level of inter-cell-interference that does not substantially exceed the threshold level of inter-cell-interference (ICI) in the neighboring cell when used to perform multi-CEU uplink transmissions in the common time-frequency resource.

15. The apparatus of claim 11, wherein the normal power settings further includes a second normal power level for single-CCU transmissions, and
wherein the instructions to maintain the normal power settings when the common time-frequency resource is allocated to the first CEU and the first CCU include instructions to
communicate the first normal power level to the first CEU, thereby triggering the first CEU to perform a first uplink transmission at the first normal power level in the first time-frequency resource; and
communicate the second normal power level to the first CCU, thereby triggering the first CCU to perform a first uplink transmission at the first normal power level in the first time-frequency resource.

* * * * *